(12) United States Patent
Kawasaki et al.

(10) Patent No.: US 11,643,700 B2
(45) Date of Patent: May 9, 2023

(54) HIGH-STRENGTH STEEL SHEET AND PRODUCTION METHOD THEREOF

(71) Applicant: JFE STEEL CORPORATION, Tokyo (JP)

(72) Inventors: Yoshiyasu Kawasaki, Tokyo (JP); Kazuki Endo, Tokyo (JP); Yuki Toji, Tokyo (JP); Yoshimasa Funakawa, Tokyo (JP); Satoshi Maeda, Tokyo (JP); Mai Aoyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 116 days.

(21) Appl. No.: 17/043,514

(22) PCT Filed: Mar. 20, 2019

(86) PCT No.: PCT/JP2019/011649
§ 371 (c)(1),
(2) Date: Sep. 29, 2020

(87) PCT Pub. No.: WO2019/188643
PCT Pub. Date: Oct. 3, 2019

(65) Prior Publication Data
US 2021/0108282 A1    Apr. 15, 2021

(30) Foreign Application Priority Data

Mar. 30, 2018    (JP) .............................. JP2018-066748

(51) Int. Cl.
*C21D 9/46*      (2006.01)
*B32B 15/00*     (2006.01)
(Continued)

(52) U.S. Cl.
CPC .............. *C21D 9/46* (2013.01); *B32B 15/013* (2013.01); *C21D 6/004* (2013.01); *C21D 6/005* (2013.01);
(Continued)

(58) Field of Classification Search
CPC .......... C21D 9/46; C21D 6/004; C21D 6/005; C21D 6/008; C21D 8/0205; C21D 8/0226;
(Continued)

(56) References Cited

U.S. PATENT DOCUMENTS

| 5,328,528 A | 7/1994 | Chen |
| 2010/0218857 A1 | 9/2010 | Nakagaito et al. |

(Continued)

FOREIGN PATENT DOCUMENTS

| CN | 1692166 A | 11/2005 |
| CN | 101821419 A | 9/2010 |

(Continued)

OTHER PUBLICATIONS

May 28, 2021 Office Actio issued in Chinese Patent Application No. 201980023782.1.
(Continued)

*Primary Examiner* — Anthony M Liang
*Assistant Examiner* — Danny N Kang
(74) *Attorney, Agent, or Firm* — Oliff PLC

(57) ABSTRACT

A high-strength steel includes a steel structure with: in area fraction, 60.0% to less than 90.0% of ferrite, 0% to less than 5.0% of unrecrystallized ferrite, 2.0% to 25.0% of martensite, 0% to 5.0% of carbide, and 0% to 3.0% of bainite; in volume fraction, more than 7.0% of retained austenite; in a cross-sectional view of 100 μm×100 μm, a value obtained by dividing number of retained austenite that are not adjacent to retained austenite whose crystal orientations are different by
(Continued)

a total number of retained austenite being less than 0.80, an average crystal grain size of the ferrite being 6.0 μm or less, an average crystal grain size of the retained austenite being 3.0 μm or less, and a value obtained by dividing, by mass %, an average content of Mn in the retained austenite by an average content of Mn in steel being 1.50 or more.

4 Claims, 1 Drawing Sheet

(51) Int. Cl.

| | | |
|---|---|---|
| *C21D 6/00* | (2006.01) | |
| *C21D 8/00* | (2006.01) | |
| *C22C 38/00* | (2006.01) | |
| *B32B 15/01* | (2006.01) | |
| *C21D 8/02* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *C23C 2/02* | (2006.01) | |
| *C23C 2/06* | (2006.01) | |
| *C23C 2/28* | (2006.01) | |
| *C23C 2/40* | (2006.01) | |

(52) U.S. Cl.
CPC ............ *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C23C 2/02* (2013.01); *C23C 2/06* (2013.01); *C23C 2/28* (2013.01); *C23C 2/40* (2013.01); *C21D 2211/001* (2013.01); *C21D 2211/003* (2013.01); *C21D 2211/005* (2013.01); *C21D 2211/008* (2013.01)

(58) Field of Classification Search
CPC .. C21D 8/0236; C21D 8/0263; C21D 8/0268; C21D 8/0278; C21D 8/0221; C21D 2211/001; C21D 2211/003; C21D 2211/005; C21D 2211/008; C21D 2211/002; B32B 15/013; C22C 38/001; C22C 38/002; C22C 38/005; C22C 38/008; C22C 38/02; C22C 38/04; C22C 38/06; C22C 38/42; C22C 38/44; C22C 38/46; C22C 38/48; C22C 38/50; C22C 38/54; C22C 38/58; C22C 38/60; C23C 2/02; C23C 2/06; C23C 2/28; C23C 2/40
See application file for complete search history.

(56) References Cited

U.S. PATENT DOCUMENTS

| | | |
|---|---|---|
| 2013/0133792 A1 | 5/2013 | Nakagaito et al. |
| 2013/0206288 A1 | 8/2013 | Kaneko et al. |
| 2013/0244056 A1 | 9/2013 | Kawamura et al. |
| 2014/0050941 A1 | 2/2014 | Kawasaki et al. |
| 2014/0335374 A1 | 11/2014 | Nakagaito et al. |
| 2015/0037610 A1* | 2/2015 | Hata ................. C21D 9/46 148/333 |
| 2017/0130293 A1 | 5/2017 | Kaneko et al. |
| 2017/0175219 A1 | 6/2017 | Kawasaki et al. |
| 2017/0204490 A1 | 7/2017 | Kawasaki et al. |
| 2017/0211163 A1 | 7/2017 | Kawasaki et al. |
| 2017/0218472 A1 | 8/2017 | Kawasaki et al. |
| 2017/0306435 A1 | 10/2017 | Kawasaki et al. |
| 2017/0306437 A1 | 10/2017 | Nakagawa et al. |
| 2017/0314091 A1 | 11/2017 | Kawasaki et al. |
| 2017/0327919 A1* | 11/2017 | Kawasaki ............ C21D 8/0226 |
| 2018/0057916 A1 | 3/2018 | Obata et al. |
| 2018/0127846 A9 | 5/2018 | Kawasaki et al. |
| 2018/0127847 A9 | 5/2018 | Kawasaki et al. |

FOREIGN PATENT DOCUMENTS

| | | |
|---|---|---|
| CN | 102712963 A | 10/2012 |
| CN | 102859018 A | 1/2013 |
| CN | 102959116 A | 3/2013 |
| CN | 103069040 A | 4/2013 |
| CN | 103502496 A | 1/2014 |
| CN | 106574340 A | 4/2017 |
| CN | 106574341 A | 4/2017 |
| CN | 106574342 A | 4/2017 |
| CN | 107075627 A | 8/2017 |
| CN | 107075644 A | 8/2017 |
| CN | 107109553 A | 8/2017 |
| CN | 107148486 A | 9/2017 |
| CN | 107250409 A | 10/2017 |
| EP | 1 365 037 A1 | 11/2003 |
| EP | 1486574 A1 | 12/2004 |
| EP | 2 559 782 A1 | 2/2013 |
| EP | 2 757 169 A1 | 7/2014 |
| EP | 3 178 957 A1 | 6/2017 |
| EP | 3 382 049 A1 | 10/2018 |
| JP | S60-152654 A | 8/1985 |
| JP | S61-157625 A | 7/1986 |
| JP | H01-259120 A | 10/1989 |
| JP | H01-272720 A | 10/1989 |
| JP | 2001-207235 A | 7/2001 |
| JP | 2001-207236 A | 7/2001 |
| JP | 2003-138345 A | 5/2003 |
| JP | 6179674 B2 | 8/2017 |
| WO | 2009/054539 A1 | 4/2009 |
| WO | 2015/134163 A1 | 9/2015 |
| WO | 2016/021197 A1 | 2/2016 |
| WO | 2016/067623 A1 | 5/2016 |
| WO | 2016/132680 A1 | 8/2016 |

OTHER PUBLICATIONS

Nov. 20, 2020 Extended Search Report issued in European Patent Application No. 19778162.8.
Jun. 25, 2019 International Search Report issued in International Patent Application No. PCT/JP2019/011649.

* cited by examiner

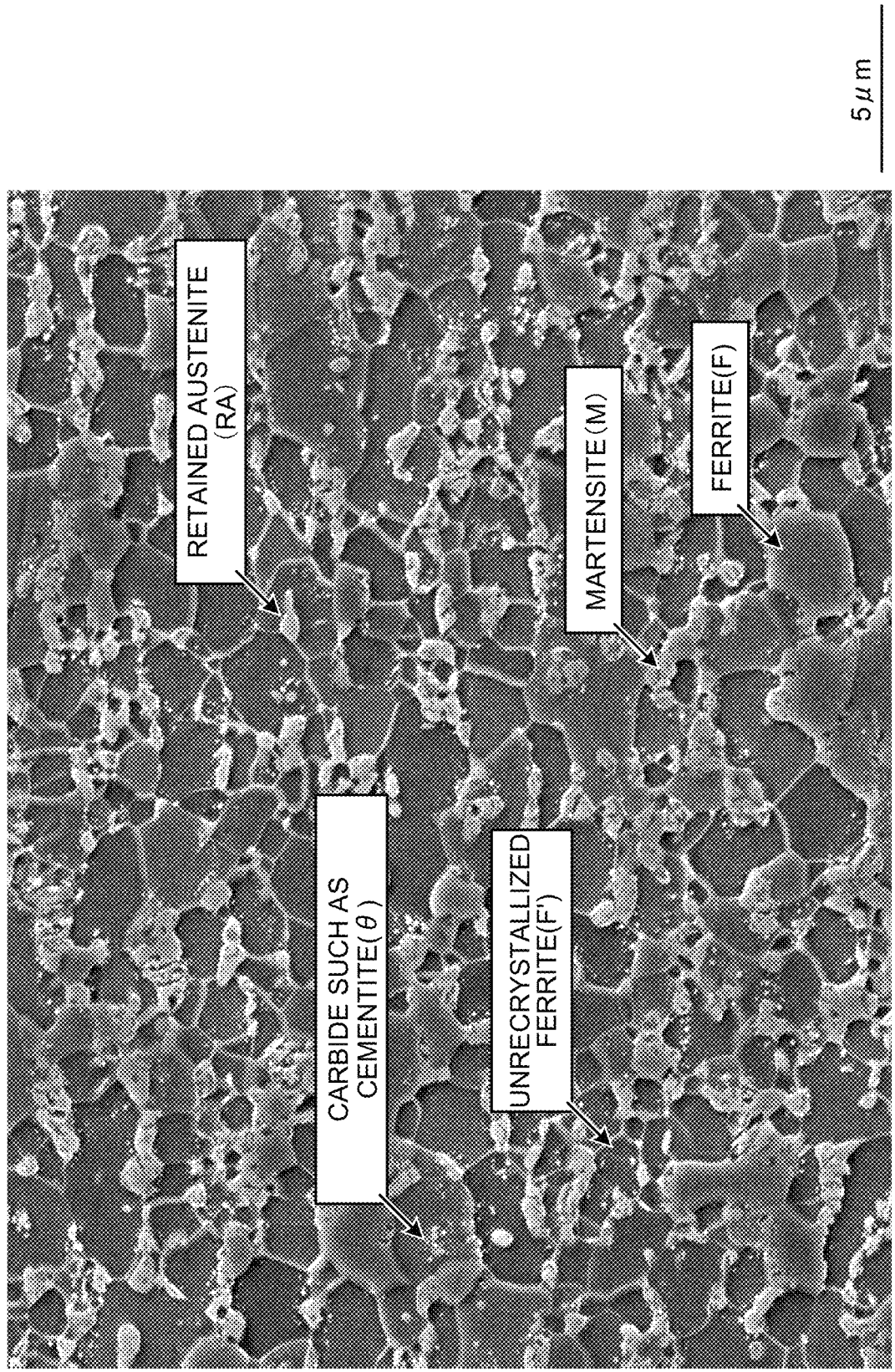

HIGH-STRENGTH STEEL SHEET AND PRODUCTION METHOD THEREOF

FIELD

The present invention relates to a high-strength steel sheet suitably applied to structural members and energy absorbing members used in the field of automobiles and a production method therefor, and more particularly, to a high-strength steel sheet having a tensile strength (TS) of 690 MPa or more and less than 980 MPa and excellent in not only formability but also crushing characteristics and a production method therefor.

BACKGROUND

In recent years, improvement of fuel efficiency of automobiles has become an important issue from the viewpoint of global environment protection. Thus, there is an active movement to reduce the thicknesses of vehicle body materials by increasing the strength of vehicle body materials and reduce the weight of the vehicle body itself. However, the strengthening of steel sheets, which are one of vehicle body materials, causes decrease in formability (ductility, deep drawability, and hole expandability), and hence it is desired to develop steel sheets having high strength and high formability. Social demands for improved collision safety in automobiles are also increasing. Thus, it is desired to develop steel sheets that have not only high strength and high formability but also excellent impact resistance in the event of a collision while driving.

A high-strength steel sheet that utilizes deformation-induced transformation of retained austenite has been proposed as a high-strength and high-ductility steel sheet. The high-strength steel sheet has a structure with retained austenite, and during forming, the steel sheet is easily formed by retained austenite, and retained austenite transforms into martensite after forming, resulting in a high-strength steel sheet. For example, Patent Literature 1 discloses a high-strength steel sheet having a tensile strength of 1,000 MPa or more and an elongation (EL) of 30% or more, which has very high ductility by utilizing the deformation-induced transformation of retained austenite. Patent Literature 2 discloses an invention that achieves a high strength-ductility balance by using high Mn steel and performing heat treatment in a two-phase region of ferrite and austenite. Patent Literature 3 discloses an invention to improve local ductility by obtaining the structure of high Mn steel containing bainite or martensite after hot rolling, forming fine retained austenite by annealing and tempering, and then obtaining the structure containing tempered bainite or tempered martensite. Furthermore, Patent Literature 4 discloses an invention in which medium Mn steel is used and heat treatment is performed in a two-phase region of ferrite and austenite to incrassate Mn into austenite, thereby forming stable retained austenite and increasing the elongation.

CITATION LIST

Patent Literature

Patent Literature 1: Japanese Patent Application Laid-open No. S61-157625
Patent Literature 2: Japanese Patent Application Laid-open No. H1-259120
Patent Literature 3: Japanese Patent Application Laid-open No. 2003-138345
Patent Literature 4: Japanese Patent No. 6179674

SUMMARY

Technical Problems

The high-strength steel sheet disclosed in Patent Literature 1 is produced by austenitizing a steel sheet whose basic components are C, Si and Mn and then quenching and isothermally holding within a bainite transformation temperature range, that is, what is called austempering. The incrassating of C into austenite by austempering produces retained austenite, but in order to obtain a large amount of retained austenite, a large amount of C with a content of more than 0.3% needs to be added. However, as the amount of C in steel increases, spot weldability decreases. Particularly when the content of C exceeds 0.3%, the decrease becomes conspicuous. Thus, it is difficult to put the high-strength steel sheet disclosed in Patent Literature 1 into practical use as steel sheets for automobiles. The invention disclosed in Patent Literature 1 has a main object to improve the ductility of the high-strength steel sheet, and hence does not take deep drawability, hole expandability, and crushing characteristics into consideration.

The invention disclosed in Patent Literature 2 does not consider the improvement of ductility through incrassating of Mn into untransformed austenite, and there is room for improvement in formability. The steel sheet disclosed in Patent Literature 3 has a structure that contains a large amount of bainite or martensite that has been tempered at high temperature, and hence it is difficult to secure the strength, and the amount of retained austenite is limited in order to improve local ductility and the elongation is also insufficient. Furthermore, in the invention disclosed in Patent Literature 4, when the heat treatment time is short, the diffusion rate of Mn into the austenite is slow, and hence the incrassating of Mn is considered to be insufficient.

The present invention has been made in view of the above-mentioned problems, and it is an object thereof to provide a high-strength steel sheet having a tensile strength of 690 MPa or more and less than 980 MPa and excellent in formability and crushing characteristics and a production method therefor.

Solution to Problems

In order to achieve the above-mentioned object and produce a high-strength steel sheet having excellent formability (ductility, deep drawability, and hole expandability) and crushing characteristics, the inventors of the present invention conducted diligent studies in view of the component composition of a steel sheet and its production method, and found the followings. That is, the inventors of the present invention found that, by appropriately adjusting a component composition containing 2.00% by mass or more and less than 3.10% by mass of Mn and other alloy elements such as Ti and reheating a steel slab having a predetermined component composition, hot rolling the steel slab with a finishing delivery temperature in a temperature range of 750° C. or more and 1,000° C. or less, such that the steel slab becomes a hot rolled steel sheet, coiling the hot rolled steel sheet in a temperature range of 300° C. or more and 750° C. or less, performing acid pickling, holding the hot rolled steel sheet in a temperature range of $Ac_1$ transformation temperature or more and $Ac_1$ transformation temperature+150° C. or less for more than 21,600 seconds and 259,200 seconds or less, cooling the hot rolled steel sheet in a temperature range from 550° C. to 400° C. at an average cooling rate of −5° C./hour or more and −200° C./hour or less, cold rolling the hot rolled steel sheet, holding the hot rolled steel sheet in a temperature range of $Ac_1$ transformation temperature+30° C. or more and $Ac_1$ transformation temperature+130° C. or less for 20 seconds or more and 900 seconds or less, cooling the hot rolled steel sheet to room temperature, performing acid pickling, increasing temperature of the hot rolled steel sheet in a temperature range from 400° C. to $Ac_1$ transformation temperature at an average temperature increase rate of 0.5° C./second or more and 50° C./second or less, holding the hot rolled steel sheet in a temperature range of $Ac_1$ transformation temperature or more and $Ac_1$ transformation temperature+150° C. or less for 20 seconds or more and 900 seconds or less, cooling the hot rolled steel sheet to room temperature, holding the hot rolled steel sheet in a temperature range of 50° C. or more and 300° C. or less for 1,800 seconds or more and 259,200 seconds or less, and cooling the hot rolled steel sheet to room temperature, a high-strength steel sheet containing, in terms of area fraction, 60.0% or more and less than 90.0% of ferrite, 0% or more and less than 5.0% of unrecrystallized ferrite, 2.0% or more and 25.0% or less of martensite, 0% or more and 5.0% or less of carbide, and 0% or more and 3.0% or less of bainite, and containing, in terms of volume fraction, more than 7.0% of retained austenite, in which, in a cross-sectional view of 100 μm×100 μm, a value obtained by dividing the number of crystal grains of retained austenite that are not adjacent to crystal grains of retained austenite whose crystal orientations are different by the total number of crystal grains of retained austenite is 0.80 or more, an average crystal grain size of ferrite is 6.0 μm or less, an average crystal grain size of retained austenite is 3.0 μm or less, and a value obtained by dividing an average content (% by mass) of Mn in retained austenite by an average content (% by mass) of Mn in steel is 1.50 or more can be produced.

The present invention has been made based on the above-mentioned knowledge, and the gist thereof is as follows.

To solve the problem and achieve the object, a high-strength steel sheet according to the present invention includes: a component composition including: by mass %, 0.030% to 0.250% of C; 0.01% to 2.00% of Si; 2.00% or more and less than 3.10% of Mn; 0.001% to 0.100% of P; 0.0001% to 0.0200% of S; 0.0005% to 0.0100% of N; 0.001% to 1.200% of Al; and the balance Fe and inevitable impurities; and a steel structure with: in terms of area fraction, 60.0% or more and less than 90.0% of ferrite, 0% or more and less than 5.0% of unrecrystallized ferrite, 2.0% to 25.0% of martensite, 0% to 5.0% of carbide, and 0% to 3.0% of bainite; in terms of volume fraction, more than 7.0% of retained austenite; in a cross-sectional view of 100 μm×100 μm, a value obtained by dividing number of retained austenite that are not adjacent to retained austenite whose crystal orientations are different by a total number of retained austenite being less than 0.80, an average crystal grain size of the ferrite being 6.0 μm or less, an average crystal grain size of the retained austenite being 3.0 μm or less, and a value obtained by dividing an average content, by mass %, of Mn in the retained austenite by an average content, by mass %, of Mn in steel being 1.50 or more.

Moreover, in the high-strength steel sheet according to the present invention, the component composition further includes: by mass %, at least one kind of element selected from: 0.002% to 0.200% of Ti; 0.005% to 0.200% of Nb; 0.005% to 0.500% of V; 0.0005% to 0.500% of W; 0.0003% to 0.0050% of B; 0.005% to 1.000% of Cr; 0.005% to 1.000% of Ni; 0.005% to 1.000% of Mo; 0.005% to 1.000% of Cu; 0.002% to 0.200% of Sn; 0.002% to 0.200% of Sb; 0.001% to 0.100% of Ta; 0.0005% to 0.0050% of Zr; 0.0005% to 0.0050% of Ca; 0.0005% to 0.0050% of Mg; and 0.0005% to 0.0050% of REM; and the balance Fe and inevitable impurities.

Moreover, in the high-strength steel sheet according to the present invention, diffusible hydrogen in steel is 0.50 ppm by mass or less.

Moreover, a method of producing a high-strength steel sheet according to the present invention is a method including steps of: reheating a steel slab having the component composition of the high-strength steel sheet according to the present invention; hot rolling the steel slab with a finishing delivery temperature in a temperature range of 750° C. to 1,000° C. such that the steel slab becomes a hot rolled steel sheet; coiling the hot rolled steel sheet in a temperature range of 300° C. to 750° C.; performing acid pickling on the hot rolled steel sheet; holding the hot rolled steel sheet in a temperature range of $Ac_1$ transformation temperature to $Ac_1$ transformation temperature+150° C. for more than 21,600 seconds and 259,200 seconds or less; cooling the hot rolled steel sheet in a temperature range from 550° C. to 400° C. at an average cooling rate of 5° C./hour to 200° C./hour; cold rolling the hot rolled steel sheet; holding the hot rolled steel sheet in a temperature range of $Ac_1$ transformation temperature+30° C. to $Ac_1$ transformation temperature+130° C. for 20 seconds to 900 seconds; cooling the hot rolled steel sheet to room temperature; performing acid pickling on the hot rolled steel sheet; increasing temperature of the hot rolled steel sheet in a temperature range from 400° C. to $Ac_1$ transformation temperature at an average temperature increase rate of 0.5° C./second to 50° C./second; holding the hot rolled steel sheet in a temperature range of $Ac_1$ transformation temperature to $Ac_1$ transformation temperature+ 150° C. for 20 seconds to 900 seconds; cooling the hot rolled steel sheet to room temperature; holding the hot rolled steel sheet in a temperature range of 50° C. to 300° C. for 1,800 seconds to 259,200 seconds; and cooling the hot rolled steel sheet to room temperature.

Moreover, a method of producing a high-strength steel sheet according to the present invention is a method including steps of: reheating a steel slab having the component composition of the high-strength steel sheet according to the present invention; hot rolling the steel slab with a finishing delivery temperature in a temperature range of 750° C. to 1,000° C., such that the steel slab becomes a hot rolled steel sheet; coiling the hot rolled steel sheet in a temperature range of 300° C. to 750° C.; performing acid pickling on the hot rolled steel sheet; holding the hot rolled steel sheet in a temperature range of $Ac_1$ transformation temperature to $Ac_1$ transformation temperature+150° C. for more than 21,600 seconds and 259,200 seconds or less; cooling the hot rolled steel sheet in a temperature range from 550° C. to 400° C. at an average cooling rate of 5° C./hour to 200° C./hour; cold rolling the hot rolled steel sheet; holding the hot rolled steel sheet in a temperature range of $Ac_1$ transformation temperature+30° C. to $Ac_1$ transformation temperature+130° C. for 20 seconds to 900 seconds; cooling the hot rolled steel sheet to room temperature; performing acid pickling on the hot rolled steel sheet; increasing temperature of the hot rolled steel sheet in a temperature range from 400° C. to $Ac_1$ transformation temperature at an average temperature increase rate of 0.5° C./second to 50° C./second; holding the hot rolled steel sheet in a temperature range of $Ac_1$ transformation temperature to $Ac_1$ transformation temperature+ 150° C. for 20 seconds to 900 seconds; cooling the hot rolled steel sheet; performing galvanization on the hot rolled steel sheet; holding the hot rolled steel sheet in a temperature range of 50° C. to 300° C. for 1,800 seconds to 259,200 seconds; and cooling the hot rolled steel sheet to room temperature.

Moreover, a method of producing a high-strength steel sheet according to the present invention is a method including steps of: reheating a steel slab having the component composition of the high-strength steel sheet according to the present invention; hot rolling the steel slab with a finishing delivery temperature in a temperature range of 750° C. to 1,000° C. such that the steel slab becomes a hot rolled steel sheet; coiling the hot rolled steel sheet in a temperature range of 300° C. to 750° C.; performing acid pickling on the hot rolled steel sheet; holding the hot rolled steel sheet in a temperature range of $Ac_1$ transformation temperature to $Ac_1$ transformation temperature+150° C. for more than 21,600 seconds and 259,200 seconds or less; cooling the hot rolled steel sheet in a temperature range from 550° C. to 400° C. at an average cooling rate of 5° C./hour to 200° C./hour; cold rolling the hot rolled steel sheet; holding the hot rolled steel sheet in a temperature range of $Ac_1$ transformation temperature+30° C. to $Ac_1$ transformation temperature+130° C. for 20 seconds to 900 seconds; cooling the hot rolled steel sheet to room temperature; performing acid pickling on the hot rolled steel sheet; increasing temperature of the hot rolled steel sheet in a temperature range from 400° C. to $Ac_1$ transformation temperature at an average temperature increase rate of 0.5° C./second to 50° C./second; holding the hot rolled steel sheet in a temperature range of $Ac_1$ transformation temperature to $Ac_1$ transformation temperature+150° C. for 20 seconds to 900 seconds; cooling the hot rolled steel sheet; performing galvanization on the hot rolled steel sheet; performing alloying on the hot rolled steel sheet in a temperature range of 450° C. to 600° C.; holding the hot rolled steel sheet in a temperature range of 50° C. to 300° C. for 1,800 seconds to 259,200 seconds; and cooling the hot rolled steel sheet to room temperature.

Moreover, a method of producing a high-strength steel sheet according to the present invention is a method including steps of: reheating a steel slab having the component composition of the high-strength steel sheet according to the present invention; hot rolling the steel slab with a finishing delivery temperature in a temperature range of 750° C. to 1,000° C. such that the steel slab becomes a hot rolled steel sheet; coiling the hot rolled steel sheet in a temperature range of 300° C. to 750° C.; performing acid pickling on the hot rolled steel sheet; holding the hot rolled steel sheet in a temperature range of $Ac_1$ transformation temperature to $Ac_1$ transformation temperature+150° C. for more than 21,600 seconds and 259,200 seconds or less; cooling the hot rolled steel sheet in a temperature range from 550° C. to 400° C. at an average cooling rate of 5° C./hour to 200° C./hour; cold rolling the hot rolled steel sheet; holding the hot rolled steel sheet in a temperature range of $Ac_1$ transformation temperature+30° C. to $Ac_1$ transformation temperature+130° C. for 20 seconds to 900 seconds; cooling the hot rolled steel sheet to room temperature; performing acid pickling on the hot rolled steel sheet; increasing temperature of the hot rolled steel sheet in a temperature range from 400° C. to $Ac_1$ transformation temperature at an average temperature increase rate of 0.5° C./second to 50° C./second; holding the hot rolled steel sheet in a temperature range of $Ac_1$ transformation temperature to $Ac_1$ transformation temperature+150° C. for 20 seconds to 900 seconds; cooling the hot rolled steel sheet to room temperature.

Moreover, a method of producing a high-strength steel sheet according to the present invention is a method including steps of: reheating a steel slab having the component composition of the high-strength steel sheet according to the present invention; hot rolling the steel slab with a finishing delivery temperature in a temperature range of 750° C. to 1,000° C. such that the steel slab becomes a hot rolled steel sheet; coiling the hot rolled steel sheet in a temperature range of 300° C. to 750° C.; performing acid pickling on the hot rolled steel sheet; holding the hot rolled steel sheet in a temperature range of $Ac_1$ transformation temperature to $Ac_1$ transformation temperature+150° C. for more than 21,600 seconds and 259,200 seconds or less; cooling the hot rolled steel sheet in a temperature range from 550° C. to 400° C. at an average cooling rate of 5° C./hour to 200° C./hour; cold rolling the hot rolled steel sheet; holding the hot rolled steel sheet in a temperature range of $Ac_1$ transformation temperature+30° C. to $Ac_1$ transformation temperature+130° C. for 20 seconds to 900 seconds; cooling the hot rolled steel sheet to room temperature; performing acid pickling on the hot rolled steel sheet; increasing temperature of the hot rolled steel sheet in a temperature range from 400° C. to $Ac_1$ transformation temperature at an average temperature increase rate of 0.5° C./second to 50° C./second; holding the hot rolled steel sheet in a temperature range of $Ac_1$ transformation temperature to $Ac_1$ transformation temperature+150° C. for 20 seconds to 900 seconds; cooling the hot rolled steel sheet; performing galvanization on the hot rolled steel sheet; performing alloying on the hot rolled steel sheet in a temperature range of 450° C. to 600° C.; and cooling the hot rolled steel sheet to room temperature.

Advantageous Effects of Invention

With the high-strength steel sheet and the production method therefor according to the present invention, a high-strength steel sheet having a tensile strength of 690 MPa or more and less than 980 MPa and excellent in not only formability but also crushing characteristics is obtained.

BRIEF DESCRIPTION OF DRAWING

FIG. 1 is an SEM photograph illustrating a steel structure in examples of the present invention.

DESCRIPTION OF EMBODIMENTS

A high-strength steel sheet and a production method therefor according to the present invention are described below.

(1) First, in the high-strength steel sheet according to the present invention, the reasons why the component composition of steel is limited to the above-mentioned ranges are described.

C: 0.030% or More and 0.250% or Less

C is an element necessary for producing a low-temperature transformation phase, such as martensite, to increase the tensile strength of steel. C is an element effective for improving the stability of retained austenite to improve the ductility of steel. When the content of C is less than 0.030%, it is difficult to secure a desired area fraction of martensite, and desired tensile strength is not obtained. It is difficult to secure a sufficient volume fraction of retained austenite, and satisfactory ductility is not obtained. On the other hand, when C is excessively added with a content of more than 0.250%, the area fraction of hard martensite becomes excessive. The ductility of steel decreases, and microvoids at grain boundaries of martensite increase during hole expanding test, and further the propagation of cracks progresses, with the result that the hole expandability of steel decreases. The hardening of a weld part and a heat-affected part is significant, and mechanical characteristics of the weld part decrease, resulting in deterioration in spot weldability and arc weldability. In view of these circumstances, the content of C is set within a range of 0.030% or more and 0.250% or less, preferably within a range of 0.080% or more and 0.200% or less.

Si: 0.01% or More 2.00% or Less

Si is an element necessary for increasing tensile strength of steel by solid solution strengthening of ferrite. Si improves work hardening ability of ferrite and is thus effective for securing satisfactory ductility. When the content of Si is less than 0.01%, its addition effect becomes less effective, and hence the lower limit of the content of Si was set to 0.01%. Excessive addition of Si with a content of more than 2.00%, however, causes decrease in coating quality. Thus, the content of Si is set within a range of 0.01% or more and 2.00% or less, preferably within a range of 0.10% or more and 0.75% or less.

Mn: 2.00% or More and Less than 3.10%

Mn is an extremely important additive element in the present invention. Mn is an element for securing the area fraction of martensite to stabilize retained austenite, which is effective for securing satisfactory strength, ductility, and deep drawability. Furthermore, Mn is an element for increasing tensile strength of steel by solid solution strengthening. Such action is recognized when the content of Mn is 2.00% or more. Excessive addition of Mn with a content of 3.10% or more, however, deteriorates coating quality. In view of these circumstances, the content of Mn is set within a range of 2.00% or more and less than 3.10%, preferably within a range of 2.40% or more and 3.00% or less.

P: 0.001% or More and 0.100% or Less

P is an element having an action of solid solution strengthening, which can be added depending on desired tensile strength. P is an element effective also for making composite structure in order to promote ferrite transformation. To obtain such effects, the content of P needs to be 0.001% or more. On the other hand, when the content of P exceeds 0.100%, weldability deteriorates and, when hot-dip galvanization alloying is performed, the alloying rate of hot-dip galvanization alloying is decreased, resulting in poor quality of hot-dip galvanizing. Thus, the content of P is set within a range of 0.001% or more and 0.100% or less, preferably within a range of 0.005% or more and 0.050% or less.

S: 0.0001% or More and 0.0200% or Less

S segregates at grain boundaries to embrittle steel during hot working, and presents as sulfide to decrease local ductility and hole expandability of steel. Thus, the content of S needs to be 0.0200% or less, preferably 0.0100% or less, more preferably 0.0050% or less. However, the content of S needs to be 0.0001% or more due to constraints of producing technology. Thus, the content of S is set within a range of 0.0001% or more and 0.0200% or less, preferably within a range of 0.0001% or more and 0.0100% or less, more preferably within a range of 0.0001% or more and 0.0050% or less.

N: 0.0005% or More and 0.0100% or Less

N is an element that deteriorates aging resistance of steel. The deterioration of aging resistance becomes conspicuous particularly when the content of N exceeds 0.0100%. A smaller content of N is more preferable, but the content of N needs to be 0.0005% or more due to constraints of producing technology. Thus, the content of N is set within the range of 0.0005% or more and 0.0100% or less, preferably the range of 0.0010% or more and 0.0070% or less.

Al: 0.001% or More and 1.200% or Less

Al is an element effective for enlarging a two-phase region of ferrite and austenite to reduce annealing temperature dependence of mechanical characteristics, that is, effective for material stability. When the content of Al is less than 0.001%, its addition effect becomes less effective, and hence the lower limit was set to 0.001%. Al is an element that actions as a deoxidant and is effective for the degree of cleanliness of steel, and is thus preferably added at a deoxidation step. However, the addition of a large amount of Al with a content of more than 1.200% increases the risk of steel fragment cracking during continuous casting and reduces manufacturability. In view of these circumstances, the content of Al is within a range of 0.001% or more and 1.200% or less, preferably within a range of 0.020% or more and 1.000% or less, more preferably within a range of 0.030% or more and 0.800% or less.

In addition to the above-mentioned components, in terms of % by mass, at least one kind of element selected from: 0.002% or more and 0.200% or less of Ti, 0.005% or more and 0.200% or less of Nb, 0.005% or more and 0.500% or less of V, 0.0005% or more and 0.500% or less of W, 0.0003% or more and 0.0050% or less of B, 0.005% or more and 1.000% or less of Ni, 0.005% or more and 1.000% or less of Cr, 0.005% or more and 1.000% or less of Mo, 0.005% or more and 1.000% or less of Cu, 0.002% or more and 0.200% or less of Sn, 0.002% or more and 0.200% or less of Sb, 0.001% or more and 0.1000% or less of Ta, 0.0005% or more and 0.0050% or less of Ca, 0.0005% or more and 0.0050% or less of Mg, 0.0005% or more and 0.0050% or less of REM may be contained, and the balance may be Fe and inevitable impurities.

Ti: 0.002% or More and 0.200% or Less

Ti is an extremely important additive element in the present invention. Ti is effective for precipitation strengthening of steel. By improving the strength of ferrite, hardness difference from a hard secondary phase (martensite or retained austenite) can be reduced to secure satisfactory hole expandability. Crystal grains of ferrite and retained austenite are refined to obtain satisfactory fatigue characteristics. The effects are obtained when the content is 0.002% or more. However, when the content exceeds 0.200%, the area fraction of hard martensite becomes excessive, and in hole expanding test, microvoids at grain boundaries of martensite increase and further the propagation of cracks progresses, with the result that the hole expandability of steel decreases. Thus, when Ti is added, the content of Ti is set within a range of 0.002% or more and 0.200% or less, preferably within a range of 0.005% or more and 0.100% or less.

Nb: 0.005% or More and 0.200% or Less, V: 0.005% or More and 0.500% or Less, W: 0.005% or More and 0.500% or Less Nb, V, and W are effective for precipitation strengthening of steel, and the effect is obtained when each content is 0.005% or more. By improving the strength of ferrite, hardness difference from a hard secondary phase (martensite or retained austenite) can be reduced to secure satisfactory hole expandability. Crystal grains of ferrite and retained austenite are refined to obtain satisfactory fatigue characteristics. The effects are obtained when the contents of Nb, W, and V are 0.005% or more. However, when the content of Nb exceeds 0.200% or when the content of V or W exceeds 0.500%, the area fraction of hard martensite becomes excessive, and in hole expanding test, microvoids at grain boundaries of martensite increase and further the propagation of cracks progresses, with the result that the hole expandability of steel decreases. Thus, when Nb is added, the content of Nb is set within a range of 0.005% or more and 0.200% or less, preferably within a range of 0.010% or more and 0.100% or less. When V or W is added, the content of V or W is set within a range of 0.005% or more and 0.500% or less, preferably within a range of 0.010% or more and 0.100% or less.

B: 0.0003% or More and 0.0050% or Less

B suppresses production and growth of ferrite from a grain boundary of austenite, and improves hole expandability and fatigue characteristics of steel by the effect of grain refinement of ferrite. The effects are obtained when the content is 0.0003% or more. However, when the content of B exceeds 0.0050%, the ductility of steel decreases. Thus, when B is added, the content of B is set within a range of 0.0003% or more and 0.0050% or less, preferably within a range of 0.0005% or more and 0.0030% or less.

Ni: 0.005% or More and 1.000% or Less

Ni is an element for stabilizing retained austenite, which is effective for securing satisfactory ductility and deep drawability, and is further an element for increasing the strength of steel by solid solution strengthening. The effects are obtained when the content is 0.005% or more. On the other hand, when Ni is added with a content of more than 1.000%, the area fraction of hard martensite becomes excessive, and in hole expanding test, microvoids at grain boundaries of martensite increase and further the propagation of cracks progresses, with the result that the hole expandability of steel decreases. Thus, when Ni is added, the content of Ni is set within a range of 0.005% or more and 1.00% or less.

Cr: 0.005% or More and 1.000% or Less, Mo: 0.005% or More and 1.000% or Less

Cr and Mo have an action to improve the balance between strength and ductility of steel, and can thus be added as needed. The effect is obtained when the contents are 0.005% or more. However, when Cr and Mo are excessively added with contents of more than 1.000%, the area fraction of hard martensite becomes excessive, and in hole expanding test, microvoids at grain boundaries of martensite increase and further the propagation of cracks progresses, with the result that the hole expandability of steel decreases. Thus, when these elements are added, the contents are set within a range of 0.005% or more and 1.000% or less.

Cu: 0.005% or More and 1.000% or Less

Cu is an element effective for strengthening of steel, and it is acceptable to use Cu for strengthening of steel as long as the content is within the range defined in the present invention. The effect is obtained when the content is 0.005% or more. On the other hand, when Cu is added with a content of more than 1.000%, the area fraction of hard martensite becomes excessive, and in hole expanding test, microvoids at grain boundaries of martensite increase and further the propagation of cracks progresses, with the result that the hole expandability of steel decreases. Thus, when Cu is added, the content of Cu is set within a range of 0.005% or more and 1.000% or less.

Sn: 0.002% or More and 0.200% or Less, Sb: 0.002% or More and 0.200% or Less

Sn and Sb are added as needed in view of suppressing decarburization in a region of several tens of μm from the surface layer of the steel sheet caused by nitridation and oxidation of the surface of the steel sheet. By suppressing nitridation and oxidation, the decrease in area fraction of martensite in the surface of the steel sheet can be suppressed, which is effective for securing strength and material stability of steel. On the other hand, when any of these elements is excessively added with a content of more than 0.200%, the toughness of steel is decreased. Thus, when Sn and Sb are added, the contents are set within a range of 0.002% or more and 0.200% or less.

Ta: 0.001% or More and 0.100% or Less

Similarly to Ti and Nb, Ta produces alloy carbide and alloy carbonitride and contributes to the increase in strength of steel. In addition, Ta is considered to have effects to partially dissolve in Nb carbide and Nb carbonitride and produces composite precipitates such as (Nb, Ta) (C, N) to remarkably suppress the state of coarse precipitate, and stabilize the contribution of precipitation strengthening to the strength of steel. Thus, Ta is preferably contained. The above-mentioned effect of precipitate stabilization is obtained when the content of Ta is 0.001% or more. On the other hand, even when Ta is excessively added, the effect of precipitate stabilization is saturated, and the cost of alloying increases. Thus, when Ta is added, the content of Ta is set within a range of 0.001% or more and 0.100% or less.

Ca: 0.0005% or More and 0.0050% or Less, Mg: 0.0005% or More and 0.0050% or Less, Zr: 0.0005% or More and 0.0050% or Less, and REM: 0.0005% or More and 0.0050% or Less Ca, Mg, Zr, and REM are elements effective for spheroidizing the shape of sulfide to improve adverse effect of sulfide on the hole expandability of steel. To obtain the effect, the contents need to be 0.0005% or more. Excessive addition with contents of more than 0.0050%, however, causes increase in inclusion to cause surface and internal defects. Thus, when Ca, Mg, Zr, and REM are added, the contents are set within a range of 0.0005% or more and 0.0050% or less.

(2) Next, microstructure of the high-strength steel sheet according to the present invention is described.

Area fraction of ferrite: 60.0% or more and less than 90.0%

To secure satisfactory ductility, the area fraction of ferrite needs to be 60.0% or more. To secure tensile strength of 690 MPa or more, the area fraction of soft ferrite needs to be 90.0% or less. The area fraction of ferrite is preferably set within the range of 70% or more and 85% or less.

Area Fraction of Unrecrystallized Ferrite: 0% or More and Less than 5.0%

To secure satisfactory deep drawability, the area fraction of unrecrystallized ferrite needs to be less than 5.0%. Note that the area fraction of unrecrystallized ferrite is preferably as small as possible.

Area Fraction of Martensite: 2.0% or More and 25.0% or Less

To secure tensile strength of 690 MPa or more, the area fraction of hard martensite needs to be 2.0% or more. To secure satisfactory ductility, the area fraction of hard martensite needs to be 25.0% or less. The area fraction of martensite is preferably set within the range of 3.0% or more and 20.0% or less.

Area Fraction of Carbide Such as Cementite: 0% or More and 5.0% or Less

The area fraction of carbide such as cementite needs to be 5.0% or less because it is difficult to secure sufficient volume fractions of martensite and retained austenite and tensile strength decreases and further it is difficult to secure satisfactory hole expandability. Note that the area fraction of carbide such as cementite is preferably as small as possible. The area fraction of carbide such as cementite is preferably within a range of 3.0% or less.

Area Fraction of Bainite: 0% or More and 3.0% or Less

The area fraction of bainite needs to be 3.0% or less because it is difficult to secure sufficient volume fractions of martensite and retained austenite and the tensile strength decreases. Note that the area fraction of bainite is preferably as small as possible. The area fractions of ferrite, martensite, carbide such as cementite, and bainite can be determined by polishing a plate thickness cross-section (L-section) parallel to the rolling direction of the steel sheet, corroding the cross-section with 3 vol. % nital, and then observing 10 fields of view of 60 μm×45 μm with a scanning electron microscope (SEM) at a magnification of 2,000 times at a position of ¼ thickness (position corresponding to ¼ of plate thickness in depth direction from surface of steel sheet), using the obtained structure images to calculate the area fractions of structures (ferrite, martensite, carbide such as cementite, and bainite) for 10 fields of view by using Image-Pro manufactured by Media Cybernetics, averaging these values. In the above-mentioned structure images, ferrite indicates gray structure (underlying structure), martensite indicates white structure, carbides such as cementite indicate fine, pure white structure, and bainite indicates gray underlying structure with internal structure. The same field of view as the above-mentioned structure images (SEM photographs) was measured by electron backscattered diffraction (EBSD), and the boundary with a crystal orientation difference of 2 degrees or more and less than 15 degrees was classified as sub-grain boundary, and ferrite with sub-grain boundary was classified as unrecrystallized ferrite.

Volume Fraction of Retained Austenite: 7% or More

To secure satisfactory ductility and deep drawability, the volume fraction of retained austenite needs to be 7% or more. The volume fraction of retained austenite is preferably 12% or more.

Average Crystal Grain Size of Ferrite: 6 μm or Less

Refinement of crystal grains of ferrite contributes to the improvement of the hole expandability of steel. Thus, the average crystal grain size of ferrite needs to be 6 μm or less in order to secure satisfactory hole expandability. The average crystal grain size of ferrite is preferably 5 μm or less.

Average Crystal Grain Size of Retained Austenite: 3 μm or Less

Refinement of crystal grains of retained austenite contributes to the improvement of the ductility and hole expandability of steel. Thus, the average crystal grain size of retained austenite needs to be 3 μm or less in order to secure satisfactory ductility, hole expandability, and crushing characteristics. The average crystal grain size of retained austenite is preferably 2.5 μm or less. Note that the average crystal grain sizes of ferrite and retained austenite can be determined by using the above-mentioned Image-Pro to determine the areas of ferrite grains and retained austenite grains, calculating equivalent circle diameters, and averaging the values thereof. Retained austenite and martensite were identified by Phase Map in electron backscattered diffraction (EBSD).

Value obtained by dividing number of crystal grains of retained austenite that are not adjacent to crystal grains of retained austenite whose crystal orientations are different in cross-sectional view of 100 μm×100 μm by total number of crystal grains of retained austenite: less than 0.80

When the number of crystal grains of retained austenite that are not adjacent to crystal grains of retained austenite whose crystal orientations are different is small, it contributes to improvement of crushing characteristics of steel. Thus, a value obtained by dividing the number of crystal grains of retained austenite that are not adjacent to crystal grains of retained austenite whose crystal orientations are different by the total number of crystal grains of retained austenite needs to be less than 0.80. The value obtained by dividing the number of crystal grains of retained austenite that are not adjacent to crystal grains of retained austenite whose crystal orientations are different by the total number of crystal grains of retained austenite is preferably 0.70 or less. Note that the crystal orientations of retained austenite were identified by using an inverse pole FIGURE (IPF) map by EBSD. The large-angle grain boundaries with an orientation difference of 15° or more were determined to be grain boundaries of retained austenite with different crystal orientations.

Value obtained by dividing average content (% by mass) of Mn in retained austenite by average content (% by mass) of Mn in steel: 1.50 or more Setting a value obtained by dividing an average content (% by mass) of Mn in retained austenite by an average content (% by mass) of Mn in steel to 1.50 or more is an extremely important constituent feature in the present invention. To secure satisfactory ductility and deep drawability, the volume fraction of stable retained austenite in which Mn is incrassated needs to be large. The value obtained by dividing the average content (% by mass) of Mn in retained austenite by the average content (% by mass) of Mn in steel is preferably 1.70 or more. Note that the average content of Mn in retained austenite can be determined by using a field emission-electron probe micro analyzer (FE-EPMA) to quantify the distribution state of Mn to each phase in the rolling direction cross-section at the position of ¼ plate thickness and by using the average value of the results of Mn content analysis of 30 retained austenite grains and 30 ferrite grains.

Diffusible Hydrogen Content in Steel: 0.50 ppm by Mass or Less

To secure satisfactory hole expandability, the diffusible hydrogen content in steel is preferably 0.50 ppm by mass or less. The diffusible hydrogen content in steel is more preferably in a range of 0.30 ppm by mass or less. A test piece having a length of 30 mm and a width of 5 mm was collected from an annealed sheet, and a plated layer was removed by grinding, and the content of diffusible hydrogen in steel and an emission peak of diffusible hydrogen were measured. The emission peak was measured by thermal desorption spectrometry (TDS), and the temperature increase rate was 200° C./hr. Note that hydrogen detected at 300° C. or less was regarded as diffusible hydrogen.

Even when the microstructure of the high-strength steel sheet according to the present invention contains, in terms of area fraction, 8% or less of tempered martensite, tempered bainite, and perlite in addition to ferrite, unrecrystallized ferrite, martensite, carbide such as cementite, bainite, and retained austenite, the effects of the present invention are not impaired.

(3) Next, production conditions of the high-strength steel sheet according to the present invention are described.

Heating Temperature of Steel Slab

The heating temperature of the steel slab is preferably, but not limited to, in a temperature range of 1,100° C. or more and 1,300° C. or less. Precipitates present at a heating stage of the steel slab will be present in a finally obtained steel sheet as coarse precipitates, and do not contribute to the strength of the steel, and hence Ti and Nb precipitates that have been precipitated during casting need to be melted again. When the heating temperature of the steel slab is less than 1,100° C., it is difficult to solubilize carbides sufficiently, and the increased rolling load increases the risk of troubles during hot rolling. Thus, the heating temperature of the steel slab needs to be 1,100° C. or more. The heating temperature of the steel slab needs to be 1,100° C. or more from the viewpoints of scale-off defects such as bubbles and segregation on the surface layer of the slab, reducing cracks and unevenness on the surface of the steel sheet, and achieving a smooth steel sheet surface. On the other hand, when the heating temperature of the steel slab exceeds 1,300° C., scale loss increases with the increase in oxidation, and hence the heating temperature of the steel slab needs to be 1,300° C. or less. The heating temperature of the steel slab is more preferably within a temperature range of 1,150° C. or more and 1,250° C. or less.

Steel slabs are preferably produced by continuous casting in order to prevent macrosegregation, but may be produced by ingot casting or thin slab casting. In addition to the conventional method for producing a steel slab and cooling the steel slab to room temperature and then reheating the same, energy-saving processes such as loading a steel slab into a heating furnace as a warm slab without cooling to room temperature, or rolling a steel slab immediately after a small amount of heat retention, such as direct delivery rolling or direct rolling, can be applied without any problem. The steel slabs are made into sheet bars by rough rolling under normal conditions, but when the heating temperature is set low, it is preferred to heat the sheet bars by using a bar heater before finish rolling to prevent troubles during hot rolling.

Finishing Delivery Temperature in Hot Rolling: 750° C. or More and 1,000° C. or Less The steel slab after heating is subjected to hot rolling through coarse rolling and finish rolling to become a hot-rolled steel sheet. In this case, when the finishing delivery temperature exceeds 1,000° C., the produced amount of oxides (scales) tends to rapidly increase so that the interface between the steel substrate and oxides becomes rough and the surface quality (coating quality) after acid pickling and cold rolling deteriorates. Any hot rolling scales persisting after acid pickling adversely affect the ductility and hole expandability of steel. Furthermore, the crystal grain size may be excessively coarsened, causing surface deterioration in a pressed part during working. On the other hand, when the finishing delivery temperature is less than 750° C., the rolling load increases and the rolling load becomes large. The rolling reduction ratio in the unrecrystallized state of austenite increases, and the area fraction of unrecrystallized ferrite increases. Abnormal aggregation structures develop, and in-plane anisotropy in the final product becomes conspicuous, which not only impairs material uniformity (material stability) but also reduces ductility, deep drawability, and crushing characteristics of steel. Thus, the finishing delivery temperature in hot rolling needs to be set within a temperature range of 750° C. or more and 1,000° C. or less. The finishing delivery temperature in hot rolling is preferably set within a temperature range of 800° C. or more and 950° C. or less.

Average Coiling Temperature in Coil after Hot Rolling: 300° C. or More and 750° C. or Less The average coiling temperature in a coil after hot rolling is an average value of coiling temperatures of the entire hot-rolled coil. When the average coiling temperature in the coil after hot rolling exceeds 750° C., the crystal grain size of ferrite in the hot-rolled steel sheet structure increases, with the result that it is difficult to secure satisfactory hole expandability of the final annealed sheet. The chemical conversion treatability and coatability of the final material decrease. On the other hand, when the average coiling temperature in the coil after hot rolling is less than 300° C., the strength of the hot-rolled steel sheet increases, and the rolling load in cold rolling increases and defects in the sheet shape occur, resulting in lowered producibility. Thus, the average coiling temperature in the coil after hot rolling needs to be within a temperature range of 300° C. or more and 750° C. or less. The average coiling temperature in the coil after hot rolling is preferably within a temperature range of 400° C. or more and 650° C. or less. It is also possible to bond rough-rolled steel sheets together during hot rolling and perform continuous finish rolling. The rough-rolled steel sheet may be coiled once. To reduce the rolling load during hot rolling, part or all of the finish rolling may be replaced with lubricant rolling. Lubricant rolling is effective from the viewpoint of uniformity of the shape and material of the steel sheet. The coefficient of friction during lubricant rolling is preferably within a range of 0.10 or more and 0.25 or less. The thus produced hot-rolled steel sheet is subjected to acid pickling. Acid pickling can remove oxides from the surface of the steel sheet, and is thus important to ensure satisfactory chemical conversion treatability and coating quality in the high strength steel sheet of the final product. Acid pickling may be performed once or may be performed several times separately.

First heat treatment: holding in temperature range of $Ac_1$ transformation temperature or more and $Ac_1$ transformation temperature+150° C. or less for more than 21,600 seconds and 259,200 seconds or less Holding in a temperature range of the $Ac_1$ transformation temperature or more and the $Ac_1$ transformation temperature+150° C. or less for more than 21,600 seconds is an extremely important constituent feature in the present invention. When held in a temperature range of less than the $Ac_1$ transformation temperature or a temperature range of more than the $Ac_1$ transformation temperature+150° C. and for 21,600 seconds or less, the incrassating of Mn in austenite does not progress sufficiently, and it becomes difficult to secure a sufficient volume fraction of retained austenite after final annealing, with the result that ductility and deep drawability of steel decrease. Note that the temperature in the first heat treatment is preferably within a temperature range of the $Ac_1$ transformation temperature+30 or more and the $Ac_1$ transformation temperature+130° C. or less. The holding time is preferably 259,200 seconds or less. When held for more than 259,200 seconds, the incrassating of Mn in austenite is saturated, and an effect to ductility and deep drawability after final annealing is decreased, and the cost may increase.

Average Cooling Rate in Temperature Range from 550° C. to 400° C. after First Heat Treatment: 5° C./Hour or More and 200° C./Hour or Less Also in austenite in which Mn has been incrassated during first heat treatment, when the average cooling rate in a temperature range from 550° C. to 400° C. exceeds 200° C./hour, coarse austenite after the long-term holding suppresses transformation of perlite. The perlite becomes fine ferrite and fine retained austenite through heat treatment after cold rolling, and hence improves the ductility and hole expandability of steel. When the amount of the perlite is large, the number of crystal grains of retained austenite that are not adjacent to crystal grains of retained austenite whose crystal orientations are different in the final structure is decreased, and hence crushing characteristics are improved. When the average cooling rate in the temperature range from 550° C. to 400° C. is less than 5° C./hour, the crystal grain sizes of ferrite and austenite increase, and the ductility and hole expandability of steel decrease. The average cooling rate in the temperature range from 550° C. to 400° C. is preferably set within a range of 10° C./hour or more and 170° C./hour or less. The average cooling rate is a value obtained by dividing the temperature drop of 150° C. from 550° C. to 400° C. by the time required for the temperature drop of 150° C. After the above-mentioned hot rolling, the heat-treated steel sheet is subjected to acid pickling as needed in accordance with the ordinary method, and cold-rolled to obtain a cold-rolled steel sheet. Although not particularly limited, the reduction ratio in cold rolling is preferably within a range of 30% or more and 85% or less. When the reduction ratio in cold rolling is less than 30%, the {111}recrystallized structure of ferrite may develop insufficiently and satisfactory deep drawability is not obtained in some cases. On the other hand, when the rolling reduction ratio in cold rolling exceeds 85%, the load in cold rolling increases, and threading problems may occur.

Second heat treatment: holding in temperature range of $Ac_1$ transformation temperature+30° C. or more and $Ac_1$ transformation temperature+130° C. or less for 20 seconds or more and 900 seconds or less When held in a temperature range of less than $Ac_1$ transformation temperature and for less than 20 seconds, recrystallization does not sufficiently progress, and the possibility that unrecrystallized ferrite remains is high, and hence the ductility of steel may be low. On the other hand, when held for more than 900 seconds, recrystallization is completed, and hence an effect to the ductility after final annealing decreases. The steel sheet after second heat treatment is finished is cooled to room temperature and then subjected to acid pickling.

Average temperature increase rate in temperature range from 400° C. to $Ac_1$ transformation temperature after second heat treatment: 0.5° C./second or more and 50° C./second or less When the average temperature increase rate in a temperature range from 400° C. to $Ac_1$ transformation temperature after second heat treatment is less than 0.5° C./second, the average crystal grain sizes of ferrite and retained austenite become coarse, and sufficient ductility and hole expandability are not obtained. On the other hand, when the average temperature increase rate in the temperature range from 400° C. to $Ac_1$ transformation temperature after second heat treatment is more than 50° C./second, the degree of refinement of the average crystal grain sizes of ferrite and retained austenite is saturated.

Third heat treatment: holding in temperature range of $Ac_1$ transformation temperature or more and $Ac_1$ transformation temperature+150° C. or less for 20 seconds or more and 900 seconds or less Holding in a temperature range of $Ac_1$ transformation temperature or more and $Ac_1$ transformation temperature+150° C. or less for 20 seconds or more and 900 seconds or less is an extremely important constituent feature in the present invention. When held in a temperature range of less than $Ac_1$ transformation temperature and for less than 20 seconds, carbide formed during heat increase remains unmelted, and it is difficult to secure sufficient volume fractions of martensite and retained austenite, with the result that the strength of steel decreases. In a temperature range of more than $Ac_1$ transformation temperature+150° C., the area fraction of martensite becomes excessive, and it is difficult to secure the area fraction of ferrite and the volume fraction of retained austenite, and in addition, the average crystal grain sizes of ferrite and retained austenite become coarse, and sufficient ductility and hole expandability cannot be obtained. The chemical conversion treatability and coatability also decrease. The holding temperature range is preferably within a range of $Ac_1$ transformation temperature or more and $Ac_1$ transformation temperature+130° C. or less. Furthermore, when held for more than 900 seconds, average crystal grain sizes of ferrite and retained austenite become coarse, and sufficient ductility and hole expandability are not obtained. The chemical conversion treatability and coatability also decrease.

Galvanizing

When hot-dip galvanizing is performed, the annealed steel sheet is immersed in a hot-dip galvanizing bath in a temperature range of 440° C. or more and 500° C. or less and subjected to hot-dip galvanizing, and then the amount of coating adhesion is adjusted by gas wiping. Note that, as the hot-dip galvanizing bath, it is preferable to use a hot-dip galvanizing bath with the content of Al is within a range of 0.08% or more and 0.18% or less. When hot-dip galvanization alloying is performed, after hot-dip galvanizing is performed, hot-dip galvanization alloying is performed in a temperature range of 450° C. or more and 600° C. or less. When alloying is performed at a temperature of more than 600° C., untransformed austenite is transformed into perlite and a desired volume fraction of retained austenite cannot be secured, with the result that the ductility and deep drawability of steel may decrease. Thus, when hot-dip galvanization alloying is performed, hot-dip galvanization alloying is preferably performed in a temperature range of 450° C. or more and 600° C. or less.

When producing a high-strength hot-dip galvanized steel sheet and a high-strength hot-dip galvannealed steel sheet, acid pickling is performed prior to heat treatment immediately before coating (for example, between hot-rolling and coiling and first heat treatment or between heat treatment immediately before coating (third heat treatment) and heat treatment before third heat treatment (second heat treatment)), so that satisfactory coating quality is finally obtained. The reason is that the presence of oxides on the surface immediately before coating is suppressed and non-coating caused by such oxides is suppressed. More specifically, oxidizable elements (such as Mn, Cr, and Si) produce oxides on the surface of the steel sheet and are incrassated during heat treatment, and hence a depleted layer of the oxidizable elements is formed on the surface of the steel sheet (below oxides) after heat treatment. When the oxides after the oxidizable elements are removed by subsequent acid pickling, the depleted layer of the oxidizable elements appears on the surface of the steel sheet, and the surface oxidation of the oxidizable elements is suppressed in the subsequent third heat treatment.

Fourth heat treatment: holding in temperature range of 50° C. or more and 300° C. or less for 1,800 seconds or more and 259,200 seconds or less As needed, fourth heat treatment is performed as final heat treatment. When hot-dip galvanizing or hot-dip galvannealing is performed, fourth heat treatment is performed after the galvanizing or the hot-dip galvannealing. When held in a temperature range of less than 50° C. or for less than 1,800 seconds, diffusible hydrogen in steel is not emitted from steel sheets, and hence hole expandability of steel may decrease. On the other hand, when held in a temperature range of more than 300° C. or for more than 259,200 seconds, a sufficient volume fraction of retained austenite is not obtained due to decomposition of retained austenite, and the ductility of steel decreases.

Other conditions for the production method are not particularly limited, but from the viewpoint of productivity, the above-mentioned annealing is preferably performed in a continuous annealing facility. A series of treatment such as annealing, hot-dip galvanizing, and hot-dip galvanization alloying are preferably performed in a continuous galvanizing line (CGL), which is a hot-dip galvanizing line. For the above-mentioned "high-strength hot-dip galvanized steel sheet", skin pass rolling can be performed for the purpose of shape correction and surface roughness adjustment. The rolling reduction ratio in skin pass rolling is preferably set within a range of 0.1% or more and 2.0% or less. A rolling reduction ratio of less than 0.1% produces a small effect and is difficult to control. Thus, this is the lower limit of the satisfactory range. When the rolling reduction ratio exceeds 2.0%, the productivity significantly decreases, and hence this is the upper limit of the satisfactory range. Note that skin pass rolling may be performed online or offline. Skin passes with a desired rolling reduction ratio may be performed at one time, or may be performed several times separately. Various kinds of coating such as resin and oil coating can be performed.

Example

Steel with the component compositions listed in Table 1 and the balance consisting of Fe and inevitable impurities was melted in a converter and made into steel slabs by continuous casting. After the obtained steel slabs were subjected to hot rolling, acid pickling, first heat treatment, cold rolling, and annealing under the conditions listed in Table 2, high-strength cold-rolled steel sheets (CR) were obtained, and then subjected to hot-dip galvanizing to obtain hot-dip galvanized steel sheets (GI) and hot-dip galvannealed steel sheets (GA). For hot-dip galvanized steel sheets (GI), a zinc bath containing 0.19% by mass of Al was used, and for hot-dip galvannealed steel sheets (GA), a zinc bath containing 0.14% by mass of Al was used. The bath temperature was set to 465° C. The amount of coating adhesion was 45 g/m² per one side (double-sided coating), and the GA was adjusted such that the concentration of Fe in the plated layer was within a range of 9% by mass or more and 12% by mass or less. The cross-sectional microstructure, tensile characteristics, deep drawability, hole expandability, crushing characteristics, chemical conversion treatability, and coatablility of the obtained steel sheets were evaluated. The evaluation results are listed in Table 3 below.

TABLE 1

| Steel type | Component composition (% by mass) | | | | | | | | | | | | | | |
|---|---|---|---|---|---|---|---|---|---|---|---|---|---|---|---|
| | C | Si | Mn | P | S | N | Al | Ti | Nb | V | W | B | Ni | Cr | Mo |
| A | 0.131 | 0.34 | 2.62 | 0.008 | 0.0009 | 0.0032 | 0.034 | 0.028 | - | - | - | - | - | - | - |
| B | 0.145 | 0.33 | 2.91 | 0.010 | 0.0013 | 0.0028 | 0.008 | 0.045 | - | - | - | - | - | - | - |
| C | 0.162 | 0.61 | 3.02 | 0.014 | 0.0008 | 0.0042 | 0.046 | 0.051 | - | - | - | - | - | - | - |
| D | 0.149 | 0.28 | 2.78 | 0.032 | 0.0012 | 0.0030 | 0.038 | 0.041 | - | - | - | - | - | - | - |
| E | 0.135 | 0.74 | 2.90 | 0.012 | 0.0044 | 0.0035 | 0.032 | 0.050 | - | - | - | - | - | - | - |
| F | 0.225 | 0.24 | 2.42 | 0.011 | 0.0009 | 0.0025 | 0.028 | 0.018 | - | - | - | - | - | - | - |
| G | 0.039 | 0.68 | 3.05 | 0.018 | 0.0012 | 0.0045 | 0.042 | 0.032 | - | - | - | - | - | - | - |
| H | 0.146 | 1.82 | 2.85 | 0.007 | 0.0015 | 0.0020 | 0.026 | 0.030 | - | - | - | - | - | - | - |
| I | 0.132 | 0.05 | 2.68 | 0.015 | 0.0011 | 0.0025 | 0.035 | 0.046 | - | - | - | - | - | - | - |
| J | 0.015 | 0.62 | 2.85 | 0.019 | 0.0024 | 0.0038 | 0.034 | 0.035 | - | - | - | - | - | - | - |
| K | 0.105 | 3.24 | 2.64 | 0.015 | 0.0018 | 0.0030 | 0.030 | 0.028 | - | - | - | - | - | - | - |
| L | 0.176 | 0.98 | 1.82 | 0.024 | 0.0022 | 0.0032 | 0.031 | 0.020 | - | - | - | - | - | - | - |
| M | 0.136 | 0.43 | 2.65 | 0.009 | 0.0008 | 0.0036 | 0.045 | 0.001 | - | - | - | - | - | - | - |
| N | 0.142 | 0.35 | 2.82 | 0.010 | 0.0007 | 0.0025 | 0.003 | 0.030 | - | - | - | - | - | - | - |
| O | 0.132 | 0.15 | 2.74 | 0.012 | 0.0008 | 0.0042 | 1.145 | 0.061 | - | - | - | - | - | - | - |
| P | 0.163 | 0.28 | 2.94 | 0.018 | 0.0032 | 0.0032 | 0.042 | 0.018 | 0.032 | - | - | - | - | - | - |

| Steel type | Component composition (% by mass) | | | | | | | $Ac_1$ transformation temperature (° C.) | $Ac_3$ transformation temperature (° C.) | Remark |
|---|---|---|---|---|---|---|---|---|---|---|
| | Cu | Sn | Sb | Ta | Ca | Mg | Zr | REM | | | |
| A | - | - | - | - | - | - | - | - | 679 | 791 | Example steel |
| B | - | - | - | - | - | - | - | - | 671 | 780 | Example steel |
| C | - | - | - | - | - | - | - | - | 671 | 795 | Example steel |
| D | - | - | - | - | - | - | - | - | 674 | 785 | Example steel |
| E | - | - | - | - | - | - | - | - | 676 | 808 | Example steel |

TABLE 1-continued

| Steel type | | | | | | | | | Ac₁ transformation temperature (°C.) | Ac₃ transformation temperature (°C.) | Remark |
|---|---|---|---|---|---|---|---|---|---|---|---|
| F | - | - | - | - | - | - | - | - | 682 | 765 | Example steel |
| G | - | - | - | - | - | - | - | - | 672 | 830 | Example steel |
| H | - | - | - | - | - | - | - | - | 689 | 846 | Example steel |
| I | - | - | - | - | - | - | - | - | 674 | 783 | Example steel |
| J | - | - | - | - | - | - | - | - | 678 | 848 | Comparative steel |
| K | - | - | - | - | - | - | - | - | 711 | 928 | Comparative steel |
| L | - | - | - | - | - | - | - | - | 708 | 829 | Comparative steel |
| M | - | - | - | - | - | - | - | - | 679 | 784 | Comparative steel |
| N | - | - | - | - | - | - | - | - | 674 | 777 | Example steel |
| O | - | - | - | - | - | - | - | - | 674 | 1034 | Example steel |
| P | - | - | - | - | - | - | - | - | 669 | 768 | Example steel |

| Steel type | Component composition (% by mass) | | | | | | | | | | | | |
|---|---|---|---|---|---|---|---|---|---|---|---|---|---|
| | C | Si | Mn | P | S | N | Al | Ti | Nb | V | W | B | Ni | Cr | Mo |
| Q | 0.124 | 0.78 | 2.54 | 0.017 | 0.0021 | 0.0031 | 0.041 | 0.021 | - | 0.045 | - | - | - | - | - |
| R | 0.174 | 0.65 | 2.99 | 0.022 | 0.0012 | 0.0038 | 0.048 | 0.032 | - | - | 0.018 | - | - | - | - |
| S | 0.125 | 0.31 | 2.84 | 0.031 | 0.0018 | 0.0029 | 0.035 | 0.042 | - | - | - | 0.0021 | - | - | - |
| T | 0.131 | 0.51 | 2.59 | 0.024 | 0.0021 | 0.0035 | 0.033 | 0.081 | - | - | - | - | 0.327 | - | - |
| U | 0.135 | 0.41 | 2.57 | 0.021 | 0.0019 | 0.0031 | 0.044 | 0.032 | - | - | - | - | - | 0.235 | - |
| V | 0.126 | 0.28 | 2.62 | 0.014 | 0.0023 | 0.0039 | 0.036 | 0.036 | - | - | - | - | - | - | 0.151 |
| W | 0.154 | 0.47 | 2.82 | 0.011 | 0.0031 | 0.0028 | 0.037 | 0.058 | - | - | - | - | - | - | - |
| X | 0.142 | 0.26 | 2.84 | 0.008 | 0.0025 | 0.0046 | 0.034 | 0.029 | - | - | - | - | - | - | - |
| Y | 0.153 | 0.39 | 2.77 | 0.021 | 0.0017 | 0.0062 | 0.044 | 0.045 | - | - | - | - | - | - | - |
| Z | 0.163 | 0.28 | 3.01 | 0.025 | 0.0019 | 0.0040 | 0.037 | 0.034 | - | - | - | - | - | - | - |
| AA | 0.131 | 0.29 | 2.75 | 0.018 | 0.0024 | 0.0026 | 0.032 | 0.032 | 0.042 | - | - | - | - | - | - |
| AB | 0.153 | 0.54 | 2.86 | 0.023 | 0.0022 | 0.0058 | 0.051 | 0.038 | 0.051 | - | - | - | - | - | - |
| AC | 0.144 | 0.37 | 3.05 | 0.033 | 0.0018 | 0.0042 | 0.048 | 0.028 | - | - | - | - | - | - | - |
| AD | 0.136 | 0.41 | 2.69 | 0.035 | 0.0031 | 0.0036 | 0.032 | 0.026 | - | - | - | - | - | - | - |
| AE | 0.158 | 0.22 | 2.85 | 0.018 | 0.0028 | 0.0032 | 0.041 | 0.015 | - | - | - | - | - | - | - |
| AF | 0.142 | 0.16 | 2.83 | 0.025 | 0.0026 | 0.0030 | 0.054 | 0.057 | - | - | - | - | - | - | - |

| Steel type | Component composition (% by mass) | | | | | | | Ac₁ transformation temperature (°C.) | Ac₃ transformation temperature (°C.) | Remark |
|---|---|---|---|---|---|---|---|---|---|---|---|
| | Cu | Sn | Sb | Ta | Ca | Mg | Zr | REM | | | |
| Q | - | - | - | - | - | - | - | - | 686 | 814 | Example steel |
| R | - | - | - | - | - | - | - | - | 672 | 787 | Example steel |
| S | - | - | - | - | - | - | - | - | 673 | 791 | Example steel |
| T | - | - | - | - | - | - | - | - | 677 | 816 | Example steel |
| U | - | - | - | - | - | - | - | - | 684 | 788 | Example steel |
| V | - | - | - | - | - | - | - | - | 679 | 798 | Example steel |
| W | 0.238 | - | - | - | - | - | - | - | 673 | 793 | Example steel |
| X | - | 0.005 | - | - | - | - | - | - | 672 | 778 | Example steel |
| Y | - | - | 0.006 | - | - | - | - | - | 675 | 792 | Example steel |
| Z | - | - | - | 0.009 | - | - | - | - | 667 | 771 | Example steel |
| AA | - | 0.006 | - | - | - | - | - | - | 675 | 786 | Example steel |
| AB | - | - | - | 0.005 | - | - | - | - | 674 | 794 | Example steel |
| AC | - | - | - | - | 0.0021 | - | - | - | 667 | 779 | Example steel |
| AD | - | - | - | - | - | 0.0025 | - | - | 678 | 790 | Example steel |
| AE | - | - | - | - | - | - | 0.0020 | - | 671 | 768 | Example steel |
| AF | - | - | - | - | - | - | - | 0.0018 | 671 | 789 | Example steel |

Underlined part: indicating out of range of the present invention.

-: indicating the contents of inevitable impurities.

TABLE 2

| No. | Steel type | Finishing delivery temperature in hot rolling (°C.) | Average coiling temperature in coil after hot rolling (°C.) | First annealing Heat treatment temperature (°C.) | First annealing Heat treatment time (s) | Average cooling rate from 550°C. to 400°C. after first heat treatment (°C./h) | Reduction ratio in cold rolling (%) | Second annealing Heat treatment temperature (°C.) | Second annealing Heat treatment time (s) |
|---|---|---|---|---|---|---|---|---|---|
| 1 | A | 880 | 500 | 740 | 35000 | 90 | 60.0 | | |
| 2 | A | 900 | 550 | 730 | 40000 | 80 | 56.3 | 750 | 200 |
| 3 | A | 870 | 600 | 760 | 45000 | 100 | 55.6 | | |
| 4 | A | 850 | 530 | 720 | 80000 | 50 | 60.0 | 730 | 300 |
| 5 | A | 860 | 510 | 690 | 120000 | 40 | 66.7 | | |
| 6 | A | 890 | 480 | 800 | 70000 | 120 | 61.1 | 770 | 400 |
| 7 | A | 880 | 580 | 780 | 30000 | 140 | 55.6 | | |
| 8 | A | 900 | 560 | 730 | 90000 | 70 | 66.7 | 760 | 250 |
| 9 | A | 910 | 600 | 750 | 140000 | 60 | 55.6 | | |
| 10 | A | 850 | 620 | 700 | 50000 | 80 | 72.2 | 740 | 150 |

TABLE 2-continued

| No. | Steel type | Finishing delivery temperature in hot rolling (°C.) | Average coiling temperature in coil after hot rolling (°C.) | First annealing Heat treatment temperature (°C.) | First annealing Heat treatment time (s) | Average cooling rate from 550°C. to 400°C. after first heat treatment (°C./h) | Reduction ratio in cold rolling (%) | Second annealing Heat treatment temperature (°C.) | Second annealing Heat treatment time (s) |
|---|---|---|---|---|---|---|---|---|---|
| 11 | B | 920 | 500 | 750 | 60000 | 100 | 68.4 | | |
| 12 | B | 860 | 480 | 740 | 35000 | 110 | 58.8 | 750 | 200 |
| 13 | B | 880 | 620 | 720 | 70000 | 30 | 52.9 | 730 | 300 |
| 14 | B | 900 | 580 | 790 | 130000 | 40 | 66.7 | | |
| 15 | B | 870 | 550 | 700 | 40000 | 60 | 53.3 | | |
| 16 | B | 860 | 560 | 810 | 30000 | 80 | 53.3 | 730 | 400 |
| 17 | B | 850 | 600 | 690 | 90000 | 100 | 53.3 | | |
| 18 | B | 900 | 500 | 760 | 110000 | 140 | 53.3 | 760 | 150 |
| 19 | B | 910 | 510 | 780 | 50000 | 50 | 53.3 | | |
| 20 | B | 890 | 530 | 740 | 80000 | 40 | 56.3 | 780 | 200 |

| No. | Average heat increase rate from 400°C. to Ac₁ transformation temperature in third heat treatment (°C./s) | Third annealing Heat treatment temperature (°C.) | Third annealing Heat treatment time (s) | Alloying temperature (°C.) | Fourth annealing Heat treatment temperature (°C.) | Fourth annealing Heat treatment time (s) | Type* | Remark |
|---|---|---|---|---|---|---|---|---|
| 1 | 6.8 | 720 | 180 | | | | CR | Example |
| 2 | 4.3 | 730 | 220 | | | | CR | Example |
| 3 | 3.8 | 760 | 200 | | | | GI | Example |
| 4 | 20.3 | 700 | 300 | | | | GI | Example |
| 5 | 5.4 | 710 | 120 | | 100 | 40000 | GI | Example |
| 6 | 4.9 | 690 | 150 | | 150 | 20000 | GI | Example |
| 7 | 18.3 | 740 | 240 | 500 | | | GA | Example |
| 8 | 3.8 | 750 | 200 | 490 | | | GA | Example |
| 9 | 5.3 | 720 | 150 | 520 | 80 | 30000 | GA | Example |
| 10 | 25.4 | 730 | 200 | 510 | 120 | 60000 | GA | Example |
| 11 | 2.9 | 700 | 250 | | | | CR | Example |
| 12 | 4.8 | 690 | 150 | | | | CR | Example |
| 13 | 3.7 | 700 | 120 | | | | GI | Example |
| 14 | 20.6 | 720 | 160 | | | | GI | Example |
| 15 | 4.0 | 710 | 200 | | 200 | 30000 | GI | Example |
| 16 | 3.8 | 730 | 180 | | 100 | 90000 | GI | Example |
| 17 | 15.7 | 700 | 300 | 490 | | | GA | Example |
| 18 | 5.4 | 710 | 240 | 515 | | | GA | Example |
| 19 | 4.5 | 730 | 200 | 505 | 150 | 100000 | GA | Example |
| 20 | 10.5 | 700 | 200 | 500 | 90 | 70000 | GA | Example |

| No. | Steel type | Finishing delivery temperature in hot rolling (°C.) | Average coiling temperature in coil after hot rolling (°C.) | First annealing Heat treatment temperature (°C.) | First annealing Heat treatment time (s) | Average cooling rate from 550°C. to 400°C. after first heat treatment (°C./h) | Reduction ratio in cold rolling (%) | Second annealing Heat treatment temperature (°C.) | Second annealing Heat treatment time (s) |
|---|---|---|---|---|---|---|---|---|---|
| 21 | B | 700 | 550 | 740 | 70000 | 60 | 47.1 | 790 | 200 |
| 22 | B | 940 | 800 | 720 | 30000 | 110 | 56.5 | 780 | 300 |
| 23 | B | 900 | 500 | 500 | 50000 | 100 | 64.7 | 750 | 150 |
| 24 | B | 840 | 560 | 900 | 90000 | 30 | 58.8 | 770 | 200 |
| 25 | B | 890 | 540 | 790 | 12000 | 40 | 50.0 | 780 | 300 |
| 26 | B | 900 | 520 | 760 | 80000 | 220 | 60.0 | 760 | 150 |
| 27 | B | 880 | 540 | 750 | 100000 | 50 | 50.0 | 780 | 200 |
| 28 | B | 900 | 570 | 700 | 80000 | 120 | 58.8 | 740 | 300 |
| 29 | B | 880 | 510 | 750 | 40000 | 80 | 68.4 | 730 | 400 |
| 30 | B | 910 | 500 | 760 | 60000 | 40 | 61.1 | 760 | 150 |
| 31 | B | 850 | 480 | 780 | 110000 | 90 | 64.7 | 770 | 100 |
| 32 | C | 890 | 500 | 730 | 100000 | 20 | 60.0 | | |
| 33 | C | 880 | 520 | 710 | 40000 | 50 | 56.3 | 760 | 300 |
| 34 | C | 870 | 530 | 760 | 60000 | 20 | 55.6 | | |
| 35 | C | 900 | 600 | 800 | 120000 | 60 | 60.0 | 730 | 150 |
| 36 | C | 860 | 620 | 750 | 35000 | 100 | 66.7 | | |
| 37 | C | 910 | 610 | 730 | 55000 | 130 | 61.1 | 740 | 200 |
| 38 | C | 920 | 580 | 700 | 90000 | 20 | 55.6 | | |
| 39 | C | 860 | 490 | 690 | 40000 | 60 | 66.7 | 770 | 400 |
| 40 | C | 890 | 530 | 740 | 150000 | 20 | 55.6 | | |

| No. | Average heat increase rate from 400°C. to Ac₁ transformation temperature in third heat treatment (°C./s) | Third annealing Heat treatment temperature (°C.) | Third annealing Heat treatment time (s) | Alloying temperature (°C.) | Fourth annealing Heat treatment temperature (°C.) | Fourth annealing Heat treatment time (s) | Type* | Remark |
|---|---|---|---|---|---|---|---|---|
| 21 | 2.7 | 700 | 300 | 520 | 150 | 80000 | GA | Comparative example |
| 22 | 5.4 | 710 | 200 | 510 | 200 | 40000 | GA | Comparative example |
| 23 | 4.8 | 720 | 260 | | 100 | 60000 | CR | Comparative example |

TABLE 2-continued

| No. | | | | | | | | | |
|---|---|---|---|---|---|---|---|---|---|
| 24 | 3.5 | 740 | 190 | 530 | 80 | 100000 | | GA | Comparative example |
| 25 | 2.7 | 720 | 100 | | 90 | 90000 | | GI | Comparative example |
| 26 | 6.0 | 730 | 230 | 510 | | | | GA | Comparative example |
| 27 | 0.2 | 700 | 120 | 520 | 150 | 70000 | | GA | Comparative example |
| 28 | 4.5 | 600 | 170 | 490 | 100 | 100000 | | GA | Comparative example |
| 29 | 2.3 | 850 | 320 | 500 | 120 | 40000 | | GA | Comparative example |
| 30 | 3.5 | 750 | 5 | 520 | 90 | 80000 | | GA | Comparative example |
| 31 | 2.6 | 700 | 1100 | | 200 | 30000 | | CR | Comparative example |
| 32 | 3.6 | 690 | 250 | | | | | CR | Example |
| 33 | 7.4 | 720 | 200 | | | | | CR | Example |
| 34 | 10.4 | 710 | 180 | | | | | GI | Example |
| 35 | 16.7 | 750 | 400 | | | | | GI | Example |
| 36 | 3.4 | 710 | 240 | | 130 | 60000 | | GI | Example |
| 37 | 5.6 | 720 | 300 | | 210 | 40000 | | GI | Example |
| 38 | 6.2 | 700 | 150 | 500 | | | | GA | Example |
| 39 | 2.7 | 720 | 120 | 495 | | | | GA | Example |
| 40 | 20.4 | 710 | 180 | 515 | 360 | 20000 | | GA | Example |

| No. | Steel type | Finishing delivery temperature in hot rolling (° C.) | Average coiling temperature in coil after hot rolling (° C.) | First annealing Heat treatment temperature (° C.) | First annealing Heat treatment time (s) | Average cooling rate from 550° C. to 400° C. after first heat treatment (° C./h) | Reduction ratio in cold rolling (%) | Second annealing Heat treatment temperature (° C.) | Second annealing Heat treatment time (s) |
|---|---|---|---|---|---|---|---|---|---|
| 41 | C | 880 | 570 | 750 | 90000 | 40 | 72.2 | 720 | 250 |
| 42 | D | 910 | 550 | 730 | 100000 | 50 | 58.8 | 760 | 200 |
| 43 | E | 880 | 520 | 750 | 40000 | 20 | 58.8 | 750 | 150 |
| 44 | F | 920 | 580 | 760 | 80000 | 90 | 57.1 | 780 | 300 |
| 45 | G | 930 | 550 | 720 | 60000 | 30 | 50.0 | 730 | 150 |
| 46 | H | 840 | 600 | 740 | 150000 | 80 | 52.9 | | |
| 47 | I | 870 | 540 | 700 | 90000 | 40 | 48.6 | 760 | 200 |
| 48 | J | 920 | 500 | 750 | 130000 | 60 | 48.2 | 740 | 300 |
| 49 | K | 890 | 630 | 790 | 200000 | 100 | 62.5 | | |
| 50 | L | 870 | 500 | 780 | 100000 | 110 | 58.8 | 770 | 250 |
| 51 | M | 900 | 550 | 740 | 60000 | 80 | 56.3 | | |
| 52 | N | 950 | 420 | 720 | 30000 | 120 | 62.5 | 730 | 100 |
| 53 | O | 830 | 500 | 750 | 70000 | 50 | 64.7 | 740 | 600 |
| 54 | P | 850 | 610 | 720 | 80000 | 60 | 50.0 | 760 | 200 |
| 55 | Q | 870 | 660 | 770 | 150000 | 40 | 53.8 | 730 | 850 |
| 56 | R | 910 | 430 | 730 | 200000 | 50 | 52.9 | | |
| 57 | S | 940 | 520 | 710 | 90000 | 30 | 47.1 | | |
| 58 | T | 920 | 500 | 780 | 60000 | 20 | 55.6 | 780 | 50 |
| 59 | U | 860 | 590 | 750 | 50000 | 50 | 56.3 | 720 | 250 |
| 60 | V | 820 | 630 | 730 | 80000 | 20 | 70.6 | | |

| No. | Average heat increase rate from 400° C. to Ac₁ transformation temperature in third heat treatment (° C./s) | Third annealing Heat treatment temperature (° C.) | Third annealing Heat treatment time (s) | Alloying temperature (° C.) | Fourth annealing Heat treatment temperature (° C.) | Fourth annealing Heat treatment time (s) | Type* | Remark |
|---|---|---|---|---|---|---|---|---|
| 41 | 3.6 | 700 | 200 | 505 | 60 | 120000 | GA | Example |
| 42 | 4.9 | 690 | 300 | 550 | 100 | 40000 | GA | Example |
| 43 | 5.2 | 740 | 200 | 510 | | | GA | Example |
| 44 | 5.8 | 730 | 320 | | 120 | 80000 | GI | Example |
| 45 | 2.1 | 750 | 150 | | | | CR | Example |
| 46 | 3.8 | 760 | 180 | 580 | | | GA | Example |
| 47 | 11.6 | 750 | 280 | 470 | 90 | 60000 | GA | Example |
| 48 | 2.9 | 700 | 300 | | | | CR | Comparative example |
| 49 | 12.9 | 730 | 250 | 580 | 150 | 30000 | GA | Comparative example |
| 50 | 3.1 | 720 | 150 | 530 | | | GA | Comparative example |
| 51 | 2.2 | 710 | 270 | | 250 | 10000 | GI | Comparative example |
| 52 | 2.7 | 690 | 360 | 500 | 70 | 100000 | GA | Example |
| 53 | 3.7 | 720 | 300 | | | | CR | Example |
| 54 | 4.3 | 710 | 330 | | | | CR | Example |
| 55 | 5.4 | 700 | 800 | 560 | 160 | 60000 | GA | Example |

TABLE 2-continued

| No. | | | | | | | | | |
|---|---|---|---|---|---|---|---|---|---|
| 56 | | 3.8 | 720 | 200 | 550 | | | GA | Example |
| 57 | | 3.6 | 700 | 150 | 570 | | | GA | Example |
| 58 | | 3.3 | 700 | 200 | 500 | 200 | 40000 | GA | Example |
| 59 | | 3.8 | 710 | 150 | | | | GI | Example |
| 60 | | 5.4 | 750 | 50 | 520 | | | GA | Example |

| No. | Steel type | Finishing delivery temperature in hot rolling (° C.) | Average coiling temperature in coil after hot rolling (° C.) | First annealing Heat treatment temperature (° C.) | First annealing Heat treatment time (s) | Average cooling rate from 550° C. to 400° C. after first heat treatment (° C./h) | Reduction ratio in cold rolling (%) | Second annealing Heat treatment temperature (° C.) | Second annealing Heat treatment time (s) |
|---|---|---|---|---|---|---|---|---|---|
| 61 | W | 850 | 400 | 740 | 120000 | 50 | 64.7 | 760 | 200 |
| 62 | X | 860 | 450 | 750 | 70000 | 60 | 50.0 | 790 | 150 |
| 63 | Y | 890 | 600 | 770 | 40000 | 20 | 56.3 | 750 | 300 |
| 64 | Z | 900 | 550 | 730 | 90000 | 20 | 52.6 | | |
| 65 | AA | 920 | 650 | 760 | 130000 | 50 | 28.1 | 740 | 250 |
| 66 | AB | 900 | 520 | 800 | 150000 | 30 | 50.0 | 770 | 400 |
| 67 | AC | 870 | 500 | 690 | 90000 | 20 | 56.3 | 730 | 150 |
| 68 | AD | 880 | 520 | 740 | 60000 | 100 | 57.1 | | |
| 69 | AE | 850 | 510 | 760 | 80000 | 120 | 47.8 | 720 | 200 |
| 70 | AF | 930 | 490 | 770 | 50000 | 30 | 60.9 | 750 | 150 |

| No. | Average heat increase rate from 400° C. to $Ac_1$ transformation temperature in third heat treatment (° C./s) | Third annealing Heat treatment temperature (° C.) | Third annealing Heat treatment time (s) | Alloying temperature (° C.) | Fourth annealing Heat treatment temperature (° C.) | Fourth annealing Heat treatment time (s) | Type* | Remark |
|---|---|---|---|---|---|---|---|---|
| 61 | 25.5 | 740 | 90 | | 80 | 150000 | GI | Example |
| 62 | 2.5 | 700 | 160 | 530 | 160 | 40000 | GA | Example |
| 63 | 4.8 | 720 | 300 | | | | CR | Example |
| 64 | 34.2 | 710 | 200 | 490 | | | GA | Example |
| 65 | 4.3 | 730 | 180 | | 220 | 20000 | GI | Example |
| 66 | 4.2 | 720 | 480 | 500 | 120 | 50000 | GA | Example |
| 67 | 2.8 | 700 | 150 | | | | CR | Example |
| 68 | 14.8 | 700 | 200 | 510 | 100 | 80000 | GA | Example |
| 69 | 6.5 | 690 | 400 | | | | CR | Example |
| 70 | 6.7 | 720 | 300 | 495 | 150 | 30000 | GA | Example |

Underlined part: indicating out of range of the present invention.
*CR: Cold-rolled steel sheet, GI: Hot-dip galvanized steel sheet (without hot-dip galvanization alloying), GA: Hot-dip galvannealed steel sheet

TABLE 3

| No. | Steel type | Thickness (mm) | Area fraction of F (%) | Area fraction of F' (%) | Area fraction of M (%) | Area fraction of θ (%) | Area fraction of B (%) | Volume fraction of RA (%) | Number of RA not adjacent to RA whose crystal orientations are different/total number of RA | Average crystal grain size of F (μm) | Average crystal grain size of RA (μm) | Average Mn content in RA (% by mass) | Average Mn content in RA/ average Mn content in steel |
|---|---|---|---|---|---|---|---|---|---|---|---|---|---|
| 1 | A | 1.2 | 74.2 | 3.8 | 10.6 | 0.3 | 0.4 | 10.6 | 0.43 | 4.1 | 0.6 | 8.28 | 2.40 |
| 2 | A | 1.4 | 77.3 | 0.2 | 9.2 | 0.3 | 0.1 | 12.8 | 0.38 | 4.3 | 0.7 | 6.37 | 2.43 |
| 3 | A | 1.6 | 74.1 | 3.6 | 11.2 | 0.1 | 0.3 | 10.2 | 0.50 | 4.2 | 0.9 | 6.08 | 2.32 |
| 4 | A | 1.6 | 76.4 | 0.1 | 8.5 | 0.8 | 0 | 13.7 | 0.27 | 3.2 | 0.5 | 6.45 | 2.46 |
| 5 | A | 1.2 | 74.3 | 2.5 | 6.2 | 1.1 | 0 | 10.3 | 0.24 | 3.9 | 0.5 | 6.58 | 2.51 |
| 6 | A | 1.4 | 74.9 | 0 | 5.3 | 1.3 | 0 | 12.1 | 0.53 | 4.2 | 0.8 | 6.24 | 2.38 |
| 7 | A | 1.6 | 74.6 | 2.9 | 11.8 | 0.2 | 0.3 | 10.1 | 0.55 | 3.8 | 0.8 | 6.05 | 2.31 |
| 8 | A | 1.2 | 77.5 | 0.1 | 10.4 | 0.1 | 0 | 11.7 | 0.37 | 4.7 | 0.9 | 6.12 | 2.34 |
| 9 | A | 1.6 | 74.2 | 2.3 | 6.7 | 0.5 | 0.2 | 10.4 | 0.30 | 3.8 | 0.5 | 6.42 | 2.45 |
| 10 | A | 1.0 | 76.4 | 0 | 5.1 | 0.6 | 0 | 13.5 | 0.36 | 2.9 | 0.3 | 6.68 | 2.55 |
| 11 | B | 1.2 | 69.3 | 3.5 | 10.1 | 0.6 | 0.2 | 15.9 | 0.50 | 3.0 | 0.6 | 6.97 | 2.40 |
| 12 | B | 1.4 | 71.5 | 0 | 9.4 | 0.8 | 0 | 17.8 | 0.53 | 3.2 | 0.7 | 7.12 | 2.45 |
| 13 | B | 1.6 | 70.3 | 3.3 | 10.3 | 0.7 | 0.1 | 15.1 | 0.22 | 2.9 | 0.8 | 7.02 | 2.41 |
| 14 | B | 1.2 | 73.9 | 0 | 9.2 | 0.3 | 0 | 15.8 | 0.24 | 3.1 | 0.5 | 6.85 | 2.35 |
| 15 | B | 1.4 | 70.8 | 2.4 | 5.4 | 0.8 | 0.1 | 15.4 | 0.29 | 2.7 | 0.5 | 7.16 | 2.46 |
| 16 | B | 1.4 | 72.6 | 0 | 4.8 | 0.5 | 0 | 17.2 | 0.37 | 3.0 | 0.7 | 6.74 | 2.32 |
| 17 | B | 1.4 | 69.8 | 3.4 | 10.5 | 0.8 | 0.2 | 14.9 | 0.50 | 3.2 | 0.8 | 7.22 | 2.48 |
| 18 | B | 1.4 | 73.1 | 0 | 9.6 | 0.7 | 0 | 16.5 | 0.54 | 3.8 | 1.0 | 6.91 | 2.37 |
| 19 | B | 1.4 | 69.7 | 2.7 | 6.2 | 0.4 | 0.2 | 15.7 | 0.28 | 3.1 | 0.7 | 6.92 | 2.38 |
| 20 | B | 1.4 | 71.8 | 0 | 5.1 | 1.0 | 0 | 17.9 | 0.24 | 2.8 | 0.6 | 7.20 | 2.47 |

Diffusible hydrogen in    Punching    Reaming    Chemical

TABLE 3-continued

| No. | steel (ppm by mass) | Residual structure | TS (MPa) | EL (%) | TS × EL (MPa %) | LDR | λ (%) | λ (%) | Crushed shape | conversion treatability | Coat-ability | Type* | Remark |
|---|---|---|---|---|---|---|---|---|---|---|---|---|---|
| 1 | 0.04 | P | 732 | 32.1 | 23497 | 2.03 | 30 | 61 | Excellent | 5 | | CR | Example |
| 2 | 0.06 | P | 721 | 34.7 | 25019 | 2.06 | 37 | 69 | Excellent | 5 | | CR | Example |
| 3 | 0.16 | P | 748 | 30.8 | 23038 | 2.03 | 28 | 53 | Good | | Good | GI | Example |
| 4 | 0.29 | P | 709 | 35.8 | 25382 | 2.09 | 32 | 62 | Excellent | | Good | GI | Example |
| 5 | 0.02 | TM, TB, P | 722 | 31.9 | 23032 | 2.03 | 35 | 65 | Excellent | | Good | GI | Example |
| 6 | 0.01 | TM, TB, P | 716 | 35.1 | 25132 | 2.06 | 42 | 70 | Good | | Good | GI | Example |
| 7 | 0.24 | P | 745 | 31.0 | 23095 | 2.03 | 28 | 55 | Good | | Good | GA | Example |
| 8 | 0.27 | P | 742 | 32.9 | 24412 | 2.06 | 34 | 59 | Excellent | | Good | GA | Example |
| 9 | 0.02 | TM, TB, P | 725 | 32.8 | 23780 | 2.03 | 33 | 64 | Excellent | | Good | GA | Example |
| 10 | 0.01 | TM, TB, P | 715 | 35.2 | 25168 | 2.09 | 39 | 71 | Excellent | | Good | GA | Example |
| 11 | 0.02 | P | 802 | 28.8 | 23098 | 2.03 | 27 | 56 | Good | 5 | | CR | Example |
| 12 | 0.03 | P | 796 | 31.9 | 25392 | 2.09 | 29 | 60 | Good | 5 | | CR | Example |
| 13 | 0.21 | P | 798 | 28.9 | 23062 | 2.03 | 28 | 58 | Excellent | | Good | GI | Example |
| 14 | 0.25 | P | 815 | 30.8 | 25102 | 2.09 | 30 | 63 | Excellent | | Good | GI | Example |
| 15 | 0.02 | TM, TB, P | 805 | 29.5 | 23748 | 2.03 | 32 | 62 | Excellent | | Good | GI | Example |
| 16 | 0.01 | TM, P | 820 | 31.0 | 25420 | 2.09 | 34 | 66 | Excellent | | Good | GI | Example |
| 17 | 0.31 | P | 797 | 29.5 | 23512 | 2.03 | 26 | 55 | Good | | Good | GA | Example |
| 18 | 0.22 | P | 806 | 32.1 | 25873 | 2.09 | 28 | 58 | Good | | Good | GA | Example |
| 19 | 0.01 | TM, TB, P | 825 | 28.2 | 23265 | 2.03 | 28 | 60 | Excellent | | Good | GA | Example |
| 20 | 0.01 | TM, P | 804 | 31.1 | 25004 | 2.09 | 30 | 65 | Excellent | | Good | GA | Example |

| No. | Steel type | Thickness (mm) | Area fraction of F (%) | Area fraction of F' (%) | Area fraction of M (%) | Area fraction of θ (%) | Area fraction of B (%) | Volume fraction of RA (%) | Number of RA not adjacent to RA whose crystal orientations are different/total number of RA | Average crystal grain size of F (μm) | Average crystal grain size of RA (μm) | Average Mn content in RA (% by mass) | Average Mn content in RA/ average Mn content in steel |
|---|---|---|---|---|---|---|---|---|---|---|---|---|---|
| 21 | B | 1.8 | 67.7 | 5.4 | 8.5 | 2.1 | 0.8 | 8.8 | 0.40 | 4.8 | 1.2 | 6.79 | 2.33 |
| 22 | B | 1.0 | 72.2 | 0.4 | 6.7 | 1.8 | 0.7 | 12.8 | 0.53 | 7.2 | 2.6 | 7.02 | 2.41 |
| 23 | B | 1.2 | 67.0 | 0.5 | 9.2 | 1.0 | 0.5 | 5.2 | 0.50 | 4.5 | 0.5 | 3.54 | 1.22 |
| 24 | B | 1.4 | 66.8 | 0.3 | 8.9 | 0.4 | 0.2 | 5.4 | 0.23 | 4.3 | 0.4 | 3.42 | 1.18 |
| 25 | B | 1.2 | 70.9 | 0.6 | 7.5 | 0.8 | 0.2 | 6.6 | 0.27 | 4.2 | 0.7 | 4.21 | 1.45 |
| 26 | B | 1.2 | 65.8 | 0.2 | 8.3 | 0.4 | 0.3 | 8.5 | 0.83 | 5.5 | 3.3 | 6.68 | 2.30 |
| 27 | B | 1.6 | 67.8 | 0.2 | 9.1 | 0.3 | 0.5 | 8.7 | 0.28 | 7.1 | 3.5 | 6.79 | 2.33 |
| 28 | B | 1.4 | 78.3 | 0.3 | 1.8 | 5.2 | 0.5 | 2.4 | 0.68 | 5.4 | 0.4 | 6.89 | 2.37 |
| 29 | B | 1.2 | 53.8 | 0.1 | 32.2 | 0.3 | 0.2 | 2.2 | 0.55 | 6.8 | 3.4 | 4.09 | 1.41 |
| 30 | B | 1.4 | 80.3 | 0 | 1.8 | 5.3 | 0.4 | 3.4 | 0.70 | 5.2 | 0.3 | 5.99 | 2.06 |
| 31 | B | 1.2 | 73.5 | 0.1 | 7.8 | 0.4 | 0.2 | 7.8 | 0.50 | 6.3 | 3.2 | 5.78 | 1.99 |
| 32 | C | 1.2 | 62.8 | 3.9 | 13.4 | 0.8 | 0 | 18.8 | 0.22 | 2.6 | 0.4 | 7.30 | 2.42 |
| 33 | C | 1.4 | 65.8 | 0.2 | 14.2 | 0.2 | 0 | 19.1 | 0.27 | 2.5 | 0.3 | 7.28 | 2.41 |
| 34 | C | 1.6 | 63.3 | 3.8 | 13.6 | 0.8 | 0 | 18.2 | 0.13 | 2.8 | 0.5 | 7.30 | 2.42 |
| 35 | C | 1.6 | 64.2 | 0.3 | 14.8 | 0.3 | 0 | 19.9 | 0.30 | 2.9 | 0.4 | 7.28 | 2.41 |
| 36 | C | 1.2 | 64.5 | 3.2 | 7.2 | 0.6 | 0 | 18.5 | 0.50 | 2.6 | 0.6 | 7.10 | 2.35 |
| 37 | C | 1.4 | 66.9 | 0.1 | 7.5 | 0.8 | 0 | 21.1 | 0.56 | 2.7 | 0.7 | 7.23 | 2.39 |
| 38 | C | 1.6 | 65.2 | 2.7 | 12.5 | 0.3 | 0 | 18.7 | 0.19 | 2.9 | 0.9 | 7.08 | 2.34 |
| 39 | C | 1.2 | 67.0 | 0.1 | 11.8 | 0.2 | 0 | 20.2 | 0.28 | 3.0 | 0.7 | 7.22 | 2.39 |
| 40 | C | 1.6 | 64.1 | 3.5 | 7.1 | 0.7 | 0 | 17.9 | 0.54 | 2.5 | 0.4 | 7.14 | 2.36 |

| No. | Diffusible hydrogen in steel (ppm by mass) | Residual structure | TS (MPa) | EL (%) | TS × EL (MPa %) | LDR | Punching λ (%) | Reaming λ (%) | Crushed shape | Chemical conversion treatability | Coat-ability | Type* | Remark |
|---|---|---|---|---|---|---|---|---|---|---|---|---|---|
| 21 | 0.01 | TM, TB, P | 812 | 22.5 | 18270 | 1.94 | 23 | 44 | Poor | | Good | GA | Comparative example |
| 22 | 0.03 | TM, P | 798 | 26.4 | 21067 | 2.00 | 15 | 33 | Good | | Poor | GA | Comparative example |
| 23 | 0.02 | TM, TB, P | 845 | 21.2 | 17914 | 1.94 | 22 | 43 | Fair | 4 | | CR | Comparative example |
| 24 | 0.01 | TM, P | 862 | 20.5 | 17671 | 1.94 | 21 | 42 | Fair | | Fair | GA | Comparative example |
| 25 | 0.02 | TM, TB, P | 841 | 22.8 | 19175 | 1.97 | 23 | 41 | Fair | | Good | GI | Comparative example |
| 26 | 0.31 | TM, P | 809 | 21.5 | 17394 | 2.00 | 17 | 36 | Poor | | Good | GA | Comparative example |
| 27 | 0.02 | TM, TB, P | 789 | 22.6 | 17831 | 2.00 | 17 | 37 | Fair | | Good | GA | Comparative example |
| 28 | 0.01 | TM, P | 648 | 23.4 | 15163 | 1.97 | 30 | 60 | Fair | | Good | GA | Comparative example |

TABLE 3-continued

| No. | | | TS (MPa) | EL (%) | TS × EL (MPa %) | LDR | Punching λ (%) | Reaming λ (%) | Crushed shape | Chemical conversion treatability | Coatability | Type* | Remark |
|---|---|---|---|---|---|---|---|---|---|---|---|---|---|
| 29 | 0.02 | TM, TB, P | 1209 | 13.4 | 16201 | 1.94 | 10 | 30 | Fair | | Poor | GA | Comparative example |
| 30 | 0.01 | TM, P | 654 | 23.2 | 15173 | 1.97 | 30 | 60 | Fair | | Good | GA | Comparative example |
| 31 | 0.01 | TM, TB, P | 792 | 22.9 | 18137 | 2.00 | 18 | 38 | Fair | 2 | | CR | Comparative example |
| 32 | 0.06 | P | 890 | 27.4 | 24386 | 2.03 | 21 | 42 | Good | 5 | | CR | Example |
| 33 | 0.04 | P | 902 | 26.9 | 24264 | 2.06 | 22 | 43 | Excellent | 5 | | CR | Example |
| 34 | 0.06 | P | 892 | 27.1 | 24173 | 2.03 | 19 | 43 | Excellent | | Good | GI | Example |
| 35 | 0.04 | P | 921 | 26.2 | 24130 | 2.06 | 20 | 42 | Excellent | | Good | GI | Example |
| 36 | 0.01 | TM, P | 894 | 26.0 | 23244 | 2.03 | 23 | 47 | Good | | Good | GI | Example |
| 37 | 0.01 | TM,, P | 906 | 27.4 | 24824 | 2.09 | 26 | 50 | Good | | Good | GI | Example |
| 38 | 0.29 | P | 891 | 26.7 | 23790 | 2.03 | 19 | 45 | Good | | Good | GA | Example |
| 39 | 0.26 | P | 905 | 28.6 | 25883 | 2.06 | 22 | 51 | Good | | Good | GA | Example |
| 40 | 0.00 | TM, P | 993 | 24.1 | 23931 | 2.03 | 18 | 47 | Excellent | | Good | GA | Example |

| No. | Steel type | Thickness (mm) | Area fraction of F (%) | Area fraction of F' (%) | Area fraction of M (%) | Area fraction of θ (%) | Area fraction of B (%) | Volume fraction of RA (%) | Number of RA not adjacent to RA whose crystal orientations are different/total number of RA | Average crystal grain size of F (μm) | Average crystal grain size of RA (μm) | Average Mn content in RA (% by mass) | Average Mn content in RA/ average Mn content in steel |
|---|---|---|---|---|---|---|---|---|---|---|---|---|---|
| 41 | C | 1.0 | 65.4 | 0.3 | 7.2 | 0.6 | 0 | 19.6 | 0.24 | 2.9 | 0.8 | 7.09 | 2.35 |
| 42 | D | 1.4 | 71.8 | 0 | 5.1 | 0.9 | 0 | 17.9 | 0.23 | 3.4 | 0.7 | 6.89 | 2.48 |
| 43 | E | 1.4 | 70.5 | 0 | 10.2 | 0.2 | 0 | 18.6 | 0.10 | 3.5 | 0.8 | 6.94 | 2.39 |
| 44 | F | 1.2 | 62.3 | 0 | 8.4 | 0.3 | 0.5 | 23.5 | 0.46 | 3.2 | 0.6 | 5.50 | 2.27 |
| 45 | G | 1.4 | 74.9 | 0 | 10.7 | 0.3 | 0 | 13.2 | 0.22 | 3.7 | 0.8 | 5.97 | 1.96 |
| 46 | H | 1.6 | 71.7 | 3.2 | 10.8 | 0.2 | 0 | 13.9 | 0.38 | 3.6 | 0.7 | 6.27 | 2.20 |
| 47 | I | 1.8 | 69.7 | 0 | 6.7 | 0.2 | 0 | 18.7 | 0.24 | 3.5 | 0.6 | 6.36 | 2.37 |
| 48 | J | 1.4 | 91.1 | 0.2 | 1.7 | 0.5 | 1.8 | 3.8 | 0.46 | 6.5 | 1.2 | 7.01 | 2.46 |
| 49 | K | 1.2 | 67.8 | 3.4 | 7.4 | 0.0 | 0.7 | 16.2 | 0.50 | 2.9 | 0.8 | 6.01 | 2.27 |
| 50 | L | 1.4 | 92.2 | 0.1 | 1.8 | 0.8 | 1.2 | 3.2 | 0.44 | 6.2 | 1.0 | 3.59 | 1.97 |
| 51 | M | 1.4 | 70.6 | 3.2 | 8.7 | 0.7 | 0.3 | 8.9 | 0.53 | 6.4 | 3.3 | 5.91 | 2.23 |
| 52 | N | 1.2 | 71.2 | 0 | 5.3 | 0.8 | 0 | 17.7 | 0.24 | 2.9 | 0.7 | 7.16 | 2.54 |
| 53 | O | 1.2 | 71.2 | 0 | 10.2 | 0.1 | 0 | 17.6 | 0.24 | 3.2 | 0.7 | 6.04 | 2.20 |
| 54 | P | 1.4 | 70.7 | 0 | 10.5 | 0.3 | 0 | 18.2 | 0.30 | 3.5 | 0.9 | 6.58 | 2.24 |
| 55 | Q | 1.2 | 71.1 | 0.3 | 6.2 | 0.8 | 0 | 18.5 | 0.27 | 3.8 | 0.4 | 6.03 | 2.37 |
| 56 | R | 1.6 | 70.2 | 3.2 | 9.8 | 0.1 | 0.1 | 15.8 | 0.24 | 3.3 | 0.8 | 6.47 | 2.16 |
| 57 | S | 1.8 | 67.1 | 2.8 | 10.6 | 0.2 | 0 | 19.2 | 0.25 | 3.2 | 0.9 | 6.57 | 2.31 |
| 58 | T | 1.6 | 71.4 | 0 | 5.9 | 0.7 | 0 | 16.5 | 0.16 | 3.9 | 0.7 | 6.38 | 2.46 |
| 59 | U | 1.4 | 72.2 | 0.2 | 10.1 | 0.3 | 0.2 | 16.4 | 0.28 | 3.2 | 0.5 | 6.42 | 2.50 |
| 60 | V | 1.0 | 73.1 | 2.1 | 9.7 | 0.1 | 0 | 14.9 | 0.16 | 3.6 | 0.5 | 6.66 | 2.54 |

| No. | Diffusible hydrogen in steel (ppm by mass) | Residual structure | TS (MPa) | EL (%) | TS × EL (MPa %) | LDR | Punching λ (%) | Reaming λ (%) | Crushed shape | Chemical conversion treatability | Coatability | Type* | Remark |
|---|---|---|---|---|---|---|---|---|---|---|---|---|---|
| 41 | 0.01 | TM, P | 989 | 26.2 | 25912 | 2.09 | 23 | 54 | Excellent | | Good | GA | Example |
| 42 | 0.01 | TM, P | 802 | 31.4 | 25183 | 2.09 | 32 | 67 | Excellent | | Good | GA | Example |
| 43 | 0.31 | TM, P | 808 | 31.0 | 25048 | 2.06 | 27 | 55 | Good | | Good | GA | Example |
| 44 | 0.02 | TM, P | 824 | 32.2 | 26533 | 2.09 | 29 | 58 | Excellent | | Good | GI | Example |
| 45 | 0.04 | P | 721 | 34.2 | 24658 | 2.06 | 32 | 64 | Excellent | 5 | | CR | Example |
| 46 | 0.21 | P | 829 | 29.3 | 24290 | 2.06 | 29 | 59 | Excellent | | Fair | GA | Example |
| 47 | 0.01 | TM, P | 831 | 30.5 | 25346 | 2.09 | 32 | 65 | Excellent | | Good | GA | Example |
| 48 | 0.05 | P | 604 | 25.8 | 15583 | 1.94 | 56 | 82 | Good | 4 | | CR | Comparative example |
| 49 | 0.01 | TM, TB, P | 805 | 28.7 | 23104 | 2.00 | 26 | 49 | Fair | | Poor | GA | Comparative example |
| 50 | 0.29 | P | 634 | 25.9 | 16421 | 1.94 | 54 | 80 | Good | | Good | GA | Comparative example |
| 51 | 0.01 | TM, TB, P | 702 | 28.9 | 20288 | 2.03 | 18 | 39 | Poor | | Good | GI | Comparative example |
| 52 | 0.01 | TM, P | 792 | 31.4 | 24869 | 2.09 | 32 | 68 | Good | | Good | GA | Example |
| 53 | 0.04 | P | 812 | 31.2 | 25334 | 2.09 | 28 | 51 | Excellent | | | CR | Example |
| 54 | 0.05 | P | 804 | 32.3 | 25969 | 2.09 | 29 | 54 | Excellent | 5 | | CR | Example |
| 55 | 0.02 | TM, TB, P | 798 | 31.4 | 25057 | 2.09 | 26 | 47 | Excellent | | Good | GA | Example |
| 56 | 0.06 | P | 812 | 30.5 | 24766 | 2.09 | 30 | 54 | Excellent | | Good | GA | Example |
| 57 | 0.24 | P | 795 | 31.8 | 25281 | 2.09 | 31 | 52 | Excellent | | Good | GA | Example |
| 58 | 0.01 | TM, TB, P | 793 | 32.6 | 25852 | 2.09 | 32 | 60 | Excellent | | Good | GA | Example |
| 59 | 0.18 | P | 804 | 30.9 | 24844 | 2.09 | 29 | 58 | Excellent | | Good | GI | Example |
| 60 | 0.25 | P | 832 | 28.7 | 23878 | 2.06 | 30 | 61 | Excellent | | Good | GA | Example |

TABLE 3-continued

| No. | Steel type | Thickness (mm) | fraction of F (%) | fraction of F' (%) | fraction of M (%) | fraction of θ (%) | fraction of B (%) | fraction of RA (%) | whose crystal orientations are different/total number of RA | grain size of F (μm) | grain size of RA (μm) | content in RA (% by mass) | in RA/ average Mn content in steel |
|---|---|---|---|---|---|---|---|---|---|---|---|---|---|
| 61 | W | 1.2 | 70.2 | 0 | 5.7 | 0.3 | 0 | 17.2 | 0.28 | 3.9 | 0.4 | 6.81 | 2.41 |
| 62 | X | 1.6 | 70.6 | 0 | 5.3 | 0.9 | 0 | 17.8 | 0.30 | 4.1 | 0.7 | 6.71 | 2.36 |
| 63 | Y | 1.4 | 71.4 | 0.1 | 9.7 | 0.2 | 0.1 | 18.1 | 0.10 | 4.2 | 0.9 | 6.53 | 2.36 |
| 64 | Z | 1.8 | 73.2 | 2.9 | 8.9 | 0.2 | 0 | 14.2 | 0.12 | 2.9 | 0.4 | 7.13 | 2.37 |
| 65 | AA | 2.3 | 69.8 | 0 | 6.2 | 0.3 | 0.2 | 17.5 | 0.27 | 3.2 | 0.5 | 6.08 | 2.21 |
| 66 | AB | 1.4 | 74.0 | 0 | 7.1 | 0.2 | 0 | 18.6 | 0.29 | 3.4 | 0.7 | 6.58 | 2.30 |
| 67 | AC | 1.4 | 67.3 | 0 | 12.4 | 0.3 | 0 | 19.6 | 0.13 | 3.5 | 0.5 | 6.29 | 2.06 |
| 68 | AD | 1.2 | 71.3 | 3.2 | 6.6 | 0.4 | 0 | 18.2 | 0.51 | 3.2 | 0.6 | 6.35 | 2.36 |
| 69 | AE | 1.2 | 70.9 | 0.1 | 11.8 | 0.2 | 0 | 16.7 | 0.55 | 3.1 | 0.7 | 6.49 | 2.28 |
| 70 | AF | 0.9 | 74.1 | 0 | 7.5 | 0.4 | 0 | 17.7 | 0.26 | 3.5 | 0.6 | 6.68 | 2.36 |

| No. | Diffusible hydrogen in steel (ppm by mass) | Residual structure | TS (MPa) | EL (%) | TS × EL (MPa %) | LDR | Punching λ (%) | Reaming λ (%) | Crushed shape | Chemical conversion treatability | Coatability | Type* | Remark |
|---|---|---|---|---|---|---|---|---|---|---|---|---|---|
| 61 | 0.02 | TM, TB, P | 828 | 30.8 | 25502 | 2.09 | 32 | 62 | Excellent | | Good | GI | Example |
| 62 | 0.01 | TM, TB, P | 794 | 31.9 | 25329 | 2.09 | 29 | 58 | Excellent | | Good | GA | Example |
| 63 | 0.05 | P | 812 | 31.4 | 25497 | 2.09 | 30 | 57 | Excellent | 5 | | CR | Example |
| 64 | 0.21 | P | 808 | 29.6 | 23917 | 2.06 | 32 | 60 | Excellent | | Good | GA | Example |
| 65 | 0.01 | TM, TB, P | 825 | 31.1 | 25658 | 2.09 | 29 | 52 | Excellent | | Good | GI | Example |
| 66 | 0 | TM, TB, P | 815 | 30.8 | 25102 | 2.09 | 30 | 54 | Excellent | | Good | GA | Example |
| 67 | 0.04 | P | 798 | 31.4 | 25057 | 2.09 | 31 | 56 | Excellent | 5 | | CR | Example |
| 68 | 0.01 | TM, TB, P | 795 | 30.2 | 24039 | 2.06 | 28 | 51 | Good | | Good | GA | Example |
| 69 | 0.04 | P | 801 | 31.3 | 25071 | 2.09 | 26 | 50 | Good | 5 | | CR | Example |
| 70 | 0.01 | TM, TB, P | 818 | 30.8 | 25194 | 2.09 | 29 | 54 | Excellent | | Good | GA | Example |

Underlined part: indicating out of range of the present invention.
F: Ferrite, F': Unrecrystallized ferrite, M: Martensite, θ: Carbide such as cementite, B: Bainite, RA: Retainedaustenite, TM: Tempered martensite, TB: Tempered bainite, P: Perlite
*CR: Cold-rolled steel sheet, GI: Hot-dip galvanized steel sheet (without hot-dip galvanization alloying), GA: Hot-dip galvannealed steel sheet $Ac_1$ transformation temperature and $Ac_3$ transformation temperature were determined by the following equations.

$Ac_1$ transformation temperature (° C.)=751−16×(% C)+11×(% Si)−28×(% Mn)−5.5×(% Cu)−16×(% Ni)+13×(% Cr)+3.4×(% Mo)

$Ac_3$ transformation temperature (° C.)=910−203√(% C)+45×(% Si)−30×(% Mn)−20×(% Cu)−15×(% Ni)+11×(% Cr)+32×(% Mo)+104×(% V)+400×(% Ti)+200×(% Al)

where (% C), (% Si), (% Mn), (% Ni), (% Cu), (% Cr), (% Mo), (% V), (% Ti), and (% Al) are the contents (% by mass) of the respective elements.

Tensile test was performed in conformity to JIS Z 2241 (2011) by using JIS No. 5 test pieces obtained by collecting samples such that the tensile direction was perpendicular to the rolling direction of steel sheets, and tensile strength (TS) and elongation (EL) were measured. Mechanical characteristics were determined to be satisfactory in the following cases.

TS 690 MPa or more and less than 780 MPa EL≥27%
TS 780 MPa or more and less than 880 MPa EL≥24%
TS 880 MPa or more and less than 980 MPa EL≥21%

As deep drawing test, cylindrical drawing test was performed, and deep drawability was evaluated from the limiting drawing ratio (LDR). In the cylindrical deep drawing test, a cylindrical punch with a diameter of 33 mmφ was used, and, for example, a die having a die diameter of 36.6 mm was used for a 1.2 mm-thickness sheet (dies for other thicknesses are described later). The test was performed with a blank holding force of 1.5 tons (14.71 kN). The sliding state of the surface changes depending on the plated state, and hence the test was performed under high lubricant conditions by placing a polyethylene sheet between a sample and a die such that the sliding state of the surface did not affect the test. The blank diameter was changed with pitches of 1 mm, and the ratio (D/d) of the blank diameter D and the punch diameter d at which the sheet was not broken but drawn was regarded as LDR. Note that the deep drawability was determined to be satisfactory when LDR≥2.00. The die diameter of the die used for the deep drawing forming test (cylindrical drawing test) was set for each thickness of the steel sheet.

0.8 mm-thickness sheet . . . die diameter of die: 35.4 mm
1.0 mm-thickness sheet . . . die diameter of die: 36.0 mm
1.2 mm-thickness sheet . . . die diameter of die: 36.6 mm
1.4 mm-thickness sheet . . . die diameter of die: 37.2 mm
1.6 mm-thickness sheet . . . die diameter of die: 37.8 mm
1.8 mm-thickness sheet . . . die diameter of die: 38.4 mm
2.0 mm-thickness sheet . . . die diameter of die: 39.0 mm
2.3 mm-thickness sheet . . . die diameter of die: 39.9 mm Hole expandability was measured in conformity to JIS Z 2256 (2010). After cutting the obtained steel sheets into 100 mm×100 mm pieces, holes of 10 mm diameter were punched with a clearance of 12%±1% or holes of 10 mm diameter were shaved and spread by reaming, and the hole diameter at the limit of crack initiation was measured by pushing a 60°-conical punch into the hole with a die with an inner diameter of 75 mm and a blank holding force of 9 tons. The limited hole expanding ratios λ (%) were determined from the following equations, and the hole expandability was evaluated from the values of the limited hole expanding ratios. Reaming is the process of cutting and widening the drilled inner diameter to a predetermined hole size with the cutting edge, and then finishing by rubbing the machined surface with the margin.

Limited hole expanding ratio $\lambda(\%)=\{(D_f-D_0)/D_0\} \times 100$ where Df is the hole diameter (mm) during crack initiation, and $D_0$ is the initial hole diameter (mm). Note that, in the present invention, the following cases were determined to be satisfactory for the respective TS ranges.

TS 690 MPa or more and less than 780 MPa (punching) $\lambda \geq 25\%$, (reaming)$\lambda \geq 45\%$ TS 780 MPa or more and less than 880 MPa (punching) $\lambda \geq 20\%$, (reaming)$\lambda \geq 40\%$ TS 880 MPa or more and less than 980 MPa (punching) $\lambda \geq 15\%$, (reaming)$\lambda \geq 35\%$ Axial crushing tests were performed as described below, and the crushing characteristics were determined by the deformation conditions. Specifically, the steel sheets were first formed into a hat-shaped cross-section by bending and then bonded by spot welding with the same type of steel sheets as the back plates. Next, a 100-kgf weight was impacted and crushed at a speed equivalent to 60 km/h in the axial direction. After that, the deformation conditions of the members were visually observed and judged to be "excellent" when the sheet did not crack but was crushed into a bellows shape, "good" when the sheet did not crack but the bellows shape was a little uneven, "fair" when the sheet was slightly cracked and the bellows shape was a little uneven, and "poor" when the sheet was cracked and did not crushed into a bellows shape.

The obtained cold-rolled steel sheets were subjected to conversion treatment by using the conversion treatment liquid (Palbond L3080 (registered trademark)) manufactured by Nihon Parkerizing Co., Ltd., and a conversion film was formed by the following method. Then, chemical conversion treatability was evaluated. First, the obtained cold-rolled steel sheets were degreased by using a degreasing fluid fine cleaner (registered trademark) manufactured by Nihon Parkerizing Co., Ltd., then washed with water, and then the surface was adjusted for 30 seconds by using a surface adjustment fluid Preparen Z (registered trademark) manufactured by Nihon Parkerizing Co., Ltd. The surface-adjusted cold-rolled steel sheets were immersed in a conversion solution (Palbond L3080) at 43° C. for 120 seconds, washed with water, and dried with warm air. The cold-rolled steel sheet was thus subjected to conversion treatment. The surface of the cold-rolled steel sheet after the conversion treatment was randomly observed in five fields of view by using an SEM at a magnification of 500 times. The area fraction [%] in the region (defect) where no chemical coating was formed was determined by image processing, and the following evaluations were made with the calculated area fractions. Score 4 or 5 is considered to be good for chemical conversion treatability. Above all, score 5 is preferred.

Score 5: 5% or less
Score 4: more than 5% and 10% or less
Score 3: more than 10% and 25% or less
Score 2: more than 25% and 40% or less
Score 1: more than 40%

Coatability was evaluated from the appearance. When there were no appearance defects such as non-coating, uneven alloying, and other defects that impaired the surface quality, and when appropriate surface quality was secured, it was judged as "good". When some minor defects were found, it was judged as "fair", and when large surface defects were found, it was judged as "poor".

All of the steel sheets in the examples of the present invention had TS of 690 MPa or more and less than 980 MPa and were excellent not only in formability (ductility, deep drawability, and hole expandability) but also in crushing characteristics. Note that FIG. 1 is an SEM photograph illustrating the steel structure in Example 20 of the present invention. On the other hand, in the comparative examples, at least one of the characteristics of TS, EL, LDR, λ, crushing form, chemical conversion treatability or coating quality was inferior.

INDUSTRIAL APPLICABILITY

The present invention can provide a high-strength steel sheet having a tensile strength (TS) of 690 MPa or more and less than 980 MPa and having excellent formability and crushing characteristics and a production method therefor.

The invention claimed is:

1. A high-strength steel sheet comprising:
a component composition including: by mass %, 0.030% to 0.250% of C; 0.01% to 2.00% of Si; 2.00% or more and less than 3.10% of Mn; 0.001% to 0.100% of P; 0.0001% to 0.0200% of S; 0.0005% to 0.0100% of N; 0.001% to 1.200% of Al; and the balance Fe and inevitable impurities; and
a steel structure with:
in terms of area fraction, 60.0% or more and less than 90.0% of ferrite, 0% or more and less than 5.0% of unrecrystallized ferrite, 2.0% to 25.0% of martensite, 0% to 5.0% of carbide, and 0% to 3.0% of bainite;
in terms of volume fraction, more than 7.0% of retained austenite;
in a cross-sectional view of 100 μm×100 μm, a value obtained by dividing number of retained austenite that are not adjacent to retained austenite whose crystal orientations are different by a total number of retained austenite being less than 0.80,
an average crystal grain size of the ferrite being 6.0 μm or less,
an average crystal grain size of the retained austenite being 3.0 μm or less, and
a value obtained by dividing an average content, by mass %, of Mn in the retained austenite by an average content, by mass %, of Mn in steel being 1.50 or more,
wherein the high-strength steel sheet has a tensile strength of 690 MPa or more and less than 980 MPa.

2. The high-strength steel sheet according to claim 1, wherein the component composition further includes: by mass %, at least one kind of element selected from: 0.002% to 0.200% of Ti; 0.005% to 0.200% of Nb; 0.005% to 0.500% of V; 0.0005% to 0.500% of W; 0.0003% to 0.0050% of B; 0.005% to 1.000% of Cr; 0.005% to 1.000% of Ni; 0.005% to 1.000% of Mo; 0.005% to 1.000% of Cu; 0.002% to 0.200% of Sn; 0.002% to 0.200% of Sb; 0.001% to 0.100% of Ta; 0.0005% to 0.0050% of Zr; 0.0005% to 0.0050% of Ca; 0.0005% to 0.0050% of Mg; and 0.0005% to 0.0050% of REM; and the balance Fe and inevitable impurities.

3. The high-strength steel sheet according to claim 1, wherein diffusible hydrogen in steel is 0.50 ppm by mass or less.

4. The high-strength steel sheet according to claim 2, wherein diffusible hydrogen in steel is 0.50 ppm by mass or less.

* * * * *